(12) United States Patent
Papasakellariou et al.

(10) Patent No.: US 9,775,134 B2
(45) Date of Patent: Sep. 26, 2017

(54) SYSTEM AND METHOD FOR COVERAGE ENHANCEMENTS OF BROADCAST CHANNELS

(71) Applicant: Samsung Electronics Co., Ltd., Suwon-si, Gyeonggi-do (KR)

(72) Inventors: Aris Papasakellariou, Houston, TX (US); Ying Li, Richardson, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 129 days.

(21) Appl. No.: 14/483,938

(22) Filed: Sep. 11, 2014

(65) Prior Publication Data

US 2015/0085717 A1    Mar. 26, 2015

Related U.S. Application Data

(60) Provisional application No. 61/880,673, filed on Sep. 20, 2013, provisional application No. 61/889,947, (Continued)

(51) Int. Cl.
*H04W 72/00* (2009.01)
*H04L 5/14* (2006.01)
(Continued)

(52) U.S. Cl.
CPC ......... *H04W 72/005* (2013.01); *H04L 5/0053* (2013.01); *H04L 5/14* (2013.01);
(Continued)

(58) Field of Classification Search
CPC ........ H04L 5/14; H04W 48/12; H04W 72/005
(Continued)

(56) References Cited

U.S. PATENT DOCUMENTS

| 2009/0280823 | A1* | 11/2009 | Petrovic | H04W 68/02 455/453 |
| 2009/0316603 | A1* | 12/2009 | Amerga | H04W 48/08 370/254 |

(Continued)

FOREIGN PATENT DOCUMENTS

| CN | WO 2014/110804 | * | 1/2013 | ............ H04W 72/04 |
| WO | WO 2014/110804 | * | 1/2013 | ............ H04W 72/04 |

OTHER PUBLICATIONS

3GPP TSG RAN WG1 Meeting #74; "Discussion on PBCH Coverage Enhancement for Low Cost MTC"; R1-133157; Barcelona, Spain; Aug. 19-23, 2013; 6 pages.

(Continued)

*Primary Examiner* — Mohamed Kamara

(57) ABSTRACT

Methods and apparatus are provided for a base station to transmit and for a UE to detect broadcast information when the UE operates in a Coverage Enhancement (CE) mode. The base station transmits repetitions of signaling conveying broadcast information in one or more subframes of each frame in a quadruple of frames. The transmission is intermittent in time. To detect the broadcast information, the UE blindly combines and decodes the repetitions of signaling assuming their existence. The base station informs the pattern for the intermittent transmissions of the signaling to UEs connected to the base station or to other base stations.

20 Claims, 27 Drawing Sheets

Related U.S. Application Data filed on Oct. 11, 2013, provisional application No. 61/880,683, filed on Sep. 20, 2013, provisional application No. 61/882,417, filed on Sep. 25, 2013.

(51) Int. Cl.
  *H04W 48/12* (2009.01)
  *H04L 5/00* (2006.01)

(52) U.S. Cl.
  CPC ........... *H04W 48/12* (2013.01); *H04L 5/0073* (2013.01); *H04L 5/0094* (2013.01)

(58) Field of Classification Search
  USPC ......... 370/311, 280, 252, 328–330; 455/450, 455/453, 458
  See application file for complete search history.

(56) References Cited

U.S. PATENT DOCUMENTS

| | | | |
|---|---|---|---|
| 2010/0022250 A1* | 1/2010 | Petrovic | H04J 11/0093 455/450 |
| 2012/0039256 A1* | 2/2012 | Kwon | H04W 48/12 370/328 |
| 2013/0188624 A1 | 7/2013 | Lee | |
| 2013/0301552 A1* | 11/2013 | Xu | H04W 4/005 370/329 |
| 2014/0036747 A1* | 2/2014 | Nory | H04W 72/0406 370/311 |
| 2014/0185530 A1* | 7/2014 | Kuchibhotla | H04W 76/023 370/329 |
| 2014/0274011 A1* | 9/2014 | Jain | H04W 8/22 455/418 |
| 2015/0049663 A1* | 2/2015 | Mukherjee | H04W 16/26 370/315 |

OTHER PUBLICATIONS

3GPP TSG RAN WG1 Meeting #74; "Discussion on PBCH Coverage Enhancement for MTC"; R1-133371; Barcelona, Spain; Aug. 19-23, 2013; 5 pages.
3GPP TSG RAN WG1 Meeting #74; "Coverage Enhancement for PBCH"; R1-132972; Barcelona, Spain; Aug. 19-23, 2013; 3 pages.
3GPP TSG RAN WG1 Meeting #72bis; "PBCH Coverage Enhancement for Low Cost MTC UEs"; R1-131015; Chicago, USA; Apr. 15-19, 2013; 2 pages.
International Search Report dated Dec. 30, 2014 in connection with International Patent Application No. PCT/KR2014/008767, 4 pages.
3GPP TS 36.211; ETSI TS 136 211 V11.2.0; Technical Specification; LTE; Evolved Universal Terrestrial Radio Access (E-UTRA); Physical channels and modulation; Apr. 2013; 111 pgs.
3GPP TS 36.212; ETSI TS 136 212 V11.2.0; Technical Specification; LTE; Evolved Universal Terrestrial Radio Access (E-UTRA); Multiplexing and channel coding; Apr. 2013; 84 pgs.
3GPP TS 36.213; ETSI TS 136 213 V11.2.0; Technical Specification; LTE; Evolved Universal Terrestrial Radio Access (E-UTRA); Physical layer procedures; Apr. 2013; 175 pgs.
3GPP TS 36.321; ETSI TS 136 321 V11.2.0; Technical Specification; LTE; Evolved Universal Terrestrial Radio Access (E-UTRA); Medium Access Control (MAC) protocol specification; Apr. 2013; 58 pgs.
3GPP TS 36.331; ETSI TS 136 331 V11.2.0; Technical Specification; LTE; Evolved Universal Terrestrial Radio Access (E-UTRA); Radio Resource Control (RRC); Protocol specification; Feb. 2013; 345 pgs.
Huawei et al., "Further Analysis and Evaluation for PBCH Coverage Improvement for MTC", 3GPP TSG RAN WG1, Meeting #72b, R1-130886, Chicago, USA, Apr. 15-19, 2013, 6 pages.
Ericsson et al., "System Information for Enhanced Coverage MTC UE", 3GPP TSG-RAN Meeting #74, R1-133422, Barcelona, Spain, Aug. 19-23, 2013, 7 pages.
Media Tek Inc., "Coverage Analysis of PBCH and System Information Transmission for MTC UEs", 3GPP TSG-RAN WG1, #72bis, R1-131179, Chicago, USA, Apr. 14-19, 2013, 5 pages.
Foreign Communication from Related Counterpart Application, European Patent Application No. 14846266.6, Supplementary European Search Report and European Search Opinion dated Apr. 13, 2017, 10 pages.

* cited by examiner

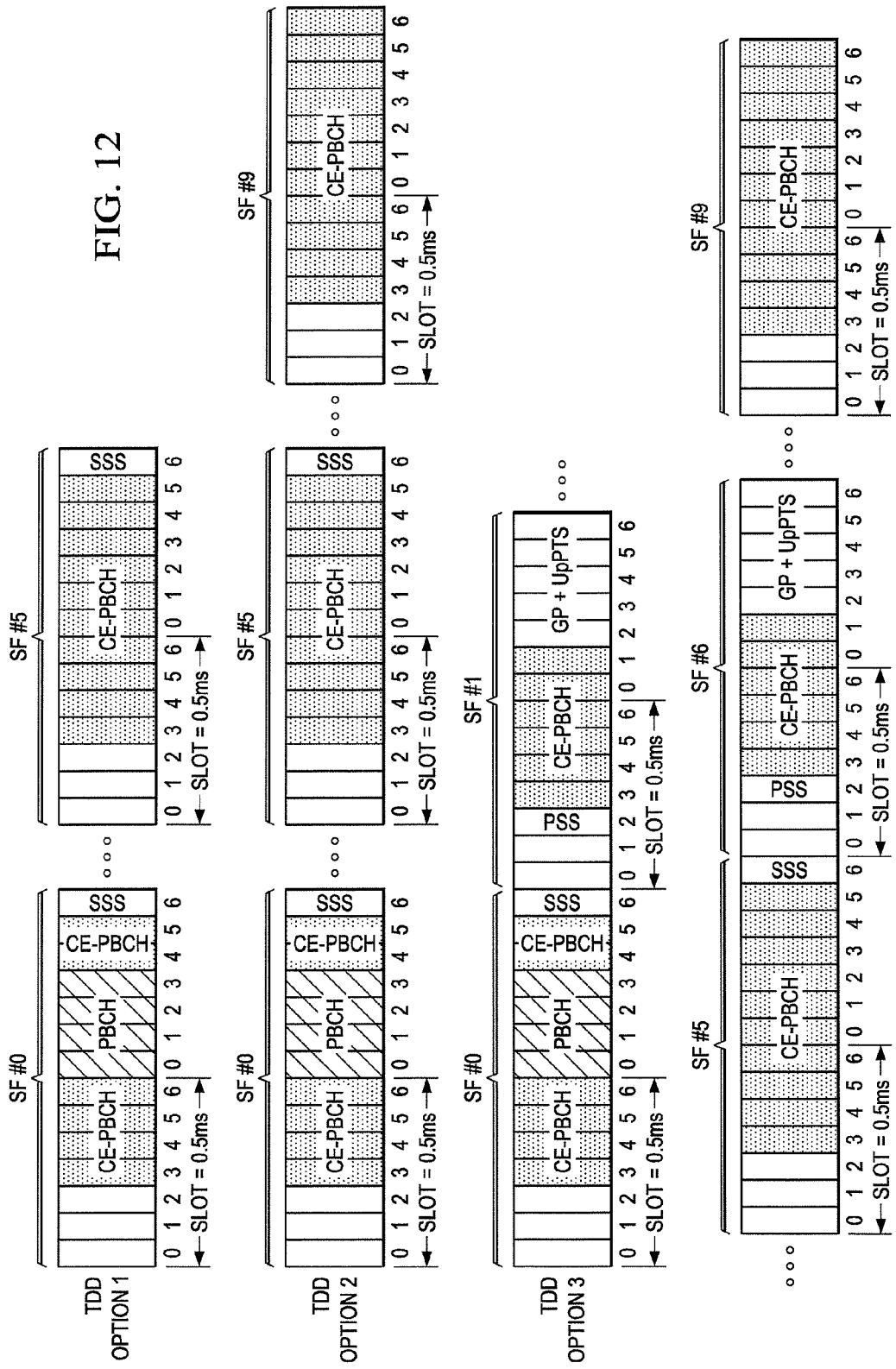

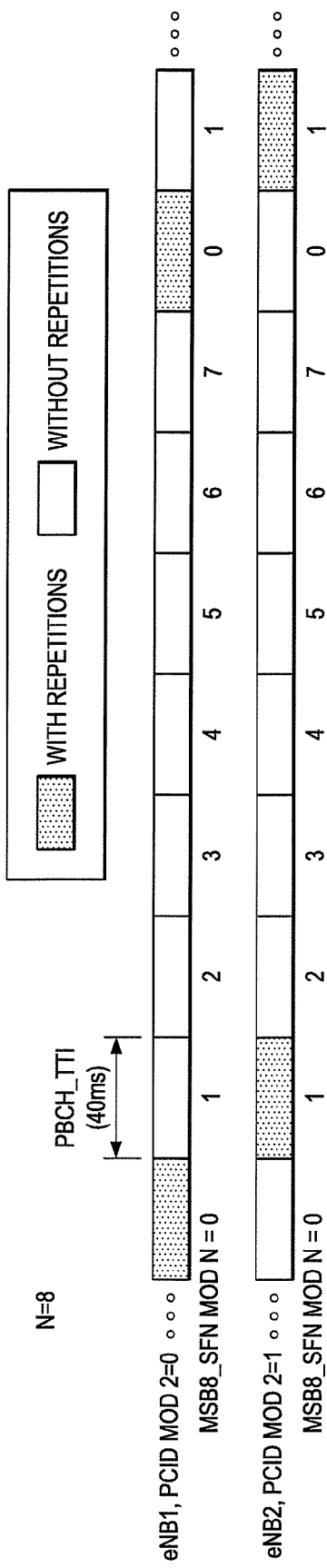
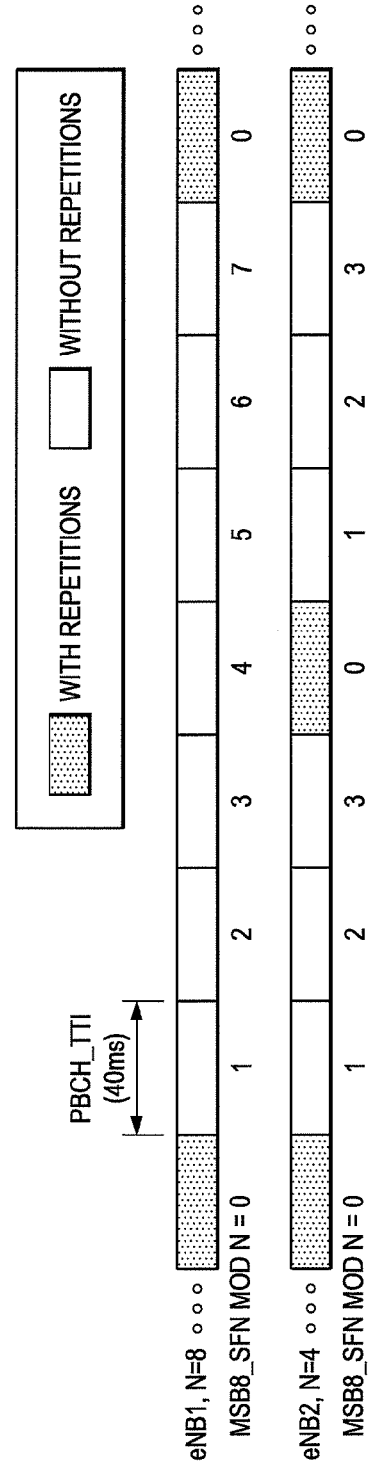
FIG. 16
FIG. 17

SYSTEM AND METHOD FOR COVERAGE ENHANCEMENTS OF BROADCAST CHANNELS

CROSS-REFERENCE TO RELATED APPLICATION AND CLAIM OF PRIORITY

The present application claims priority under 35 U.S.C. §119(e) to: U.S. Provisional Patent Application Ser. No. 61/880,673 filed Sep. 20, 2013, entitled "RESOURCES FOR REPETITIONS OF BROADCAST SIGNALING FOR MACHINE TYPE COMMUNICATIONS;" U.S. Provisional Patent Application Ser. No. 61/889,947 filed Oct. 11, 2013, entitled "RESOURCES FOR REPETITIONS OF BROADCAST SIGNALING FOR MACHINE TYPE COMMUNICATIONS;" U.S. Provisional Patent Application Ser. No. 61/880,683 filed Sep. 20, 2013, entitled "REPETITIONS OF SYSTEM INFORMATION SIGNALING IN DIFFERENT TYPES OF TRANSMISSION TIME INTERVALS;" and U.S. Provisional Patent Application Ser. No. 61/882,417 filed Sep. 25, 2013, entitled "REPETITIONS OF SYSTEM INFORMATION SIGNALING IN DIFFERENT TYPES OF TRANSMISSION TIME INTERVALS." The contents of the above-identified patent documents are incorporated herein by reference.

TECHNICAL FIELD

The present application relates generally to wireless communications and, more specifically, to coverage enhancements for broadcast signaling.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

SUMMARY

This disclosure provides methods and apparatus to support coverage enhancements for broadcast signaling.

In a first embodiment, a method includes transmitting, by a base station to User Equipments (UEs), a first broadcast channel in a first Sub-Frame (SF) of every frame in every quadruple of frames and in the center six Resource Blocks (RBs) of a bandwidth and a second broadcast channel in a one or more SFs of every frame in a first number of quadruples of frames and in the center six RBs of the bandwidth. A frame includes ten SFs. The first number of quadruples of frames is from a second number of quadruples of frames with the first number being smaller than the second number. The first broadcast channel conveys a first encoded Master Information Block (MIB) for the quadruple of frames and the second broadcast channel conveys a second encoded MIB for the quadruple of frames.

In a second embodiment, a method includes transmitting, by a base station to User Equipments (UEs), a broadcast channel conveying a Master Information Block (MIB) and a Physical Downlink Shared CHannel (PDSCH) conveying a System Information Block (SIB). Additionally, a UE detects the MIB and determines a downlink bandwidth. The UE also receives the PDSCH wherein the PDSCH is transmitted in a bandwidth determined by the downlink bandwidth.

In a third embodiment, a method includes signaling, by a first base station to a second base station a first information indicating frames where the first base station transmits in a bandwidth a Physical Downlink Shared CHannel (PDSCH) conveying a System Information Block (SIB), and a second information indicating Sub-Frames (SFs) in a frame where the first base station transmits with reduced power including zero power. The method additionally includes receiving by the second base station the first information and the second information.

In a fourth embodiment, a base station includes an encoder, a modulator, and a transmitter. The encoder is configured to encode a first Master Information Block (MIB) and a second MIB. The modulator is configured to modulate the first encoded MIB and the second encoded MIB. The transmitter is configured to transmit a first broadcast channel in a first Sub-Frame (SF) of every frame in every quadruple of frames and in the center six Resource Blocks (RBs) of a bandwidth and a second broadcast channel in a one or more SFs of every frame in a first number of quadruples of frames and in the center six RBs of the bandwidth. A frame includes ten SFs. The first number of quadruples of frames is from a second number of quadruples of frames with the first number being smaller than the second number. The first broadcast channel conveys the first encoded MIB for the quadruple of frames and the second broadcast channel conveys the second encoded MIB for the quadruple of frames.

In a fifth embodiment, a User Equipment (UE) includes a receiver, a combiner, a demodulator, and a decoder. The receiver is configured to receive a first signal in a first Sub-Frame (SF) of every frame in every quadruple of frames and in the center six Resource Blocks (RBs) of a bandwidth and a second signal in a one or more SFs of every frame in a quadruple of frames and in the center six RBs of the bandwidth. A frame includes ten SFs. The UE considers that the first signal conveys a first encoded Master Information Block (MIB) for the quadruple of frames and that the second signal conveys a second encoded MIB for the quadruple of frames. The combiner is configured to combine different receptions of the second signal in the one or more SFs of a frame and in the center six RBs of the bandwidth, and also combine the reception of the first signal in the first SF of the frame if the first MIB and the second MIB have the same information contents, to provide a third signal. The demodulator is configured to demodulate the first signal and the third signal to provide respective first demodulated symbols and second demodulated symbols. The decoder is configured to decode the first demodulated symbols and the second demodulated symbols.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 12 illustrates example options for time domain resources used to transmit CE-PBCH in a TDD system according to this disclosure;

FIG. 16 illustrates repetitions of a CE-PBCH starting from a frame determined from a Physical Cell IDentifier (PCID) value according to this disclosure;

FIG. 17 illustrates repetitions of a CE-PBCH from two eNBs using a different periodicity for CE-PBCH repetitions according to this disclosure;

DETAILED DESCRIPTION

FIGS. 1 through 36, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: 3GPP TS 36.211 v11.2.0, "E-UTRA, Physical channels and modulation" (REF 1); 3GPP TS 36.212 v11.2.0, "E-UTRA, Multiplexing and Channel coding" (REF 2); 3GPP TS 36.213 v11.2.0, "E-UTRA, Physical Layer Procedures" (REF 3); 3GPP TS 36.321 v11.2.0, "E-UTRA, Medium Access Control (MAC) protocol specification" (REF 4); and 3GPP TS 36.331 v11.2.0, "E-UTRA, Radio Resource Control (RRC) Protocol Specification" (REF 5).

This disclosure relates to broadcast signaling design for DL coverage limited User Equipments (UEs). A wireless communication network includes a DownLink (DL) that conveys signals from transmission points, such as base stations or enhanced NodeBs (eNBs), to UEs. The wireless communication network also includes an UpLink (UL) that conveys signals from UEs to reception points, such as eNBs.

Figure 1:
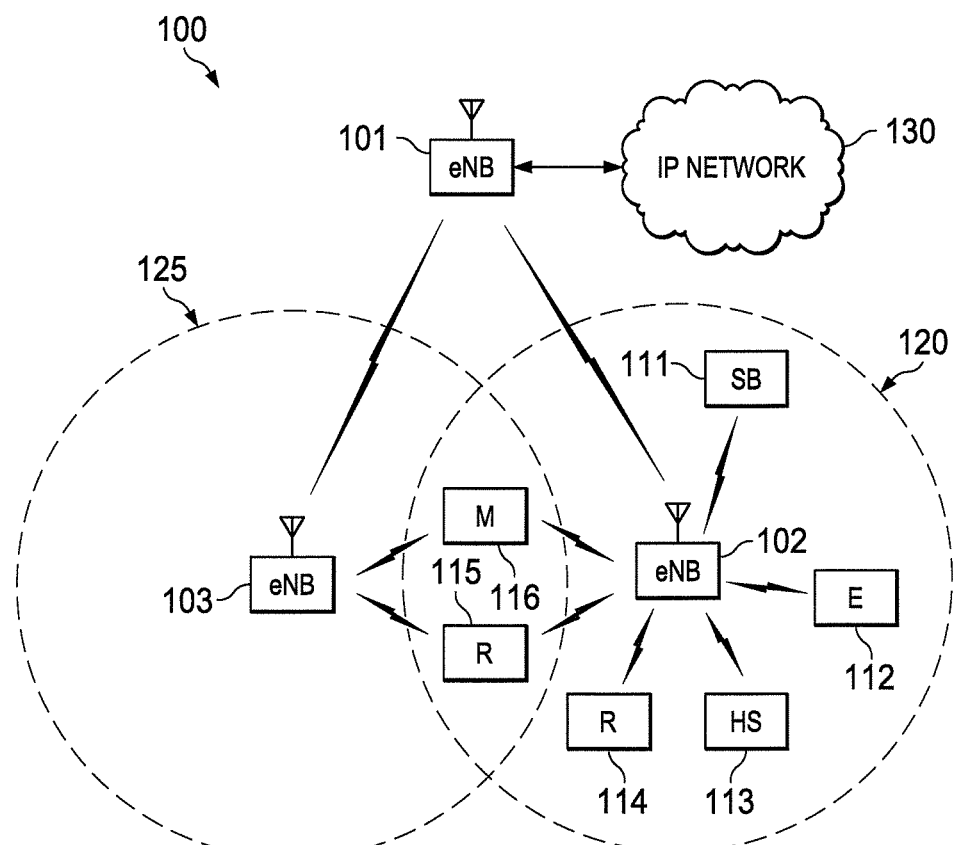
FIG. 1 illustrates an example wireless communication network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." A UE, may be fixed or mobile and may be a cellular phone, a personal computer device, and the like. For the sake of convenience, the terms "user equipment" and "UE" are used in this patent document to refer to remote wireless equipment that wirelessly accesses an eNB, whether the UE is a mobile device (such as a mobile telephone or smart-phone) or is normally considered a stationary device (such as a desktop computer or vending machine).

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, various components of the network 100 (such as the eNBs 101-103 and/or the UEs 111-116) support the adaptation of communication direction in the network 100, and can provide coverage enhancement for broadcast signaling.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2:
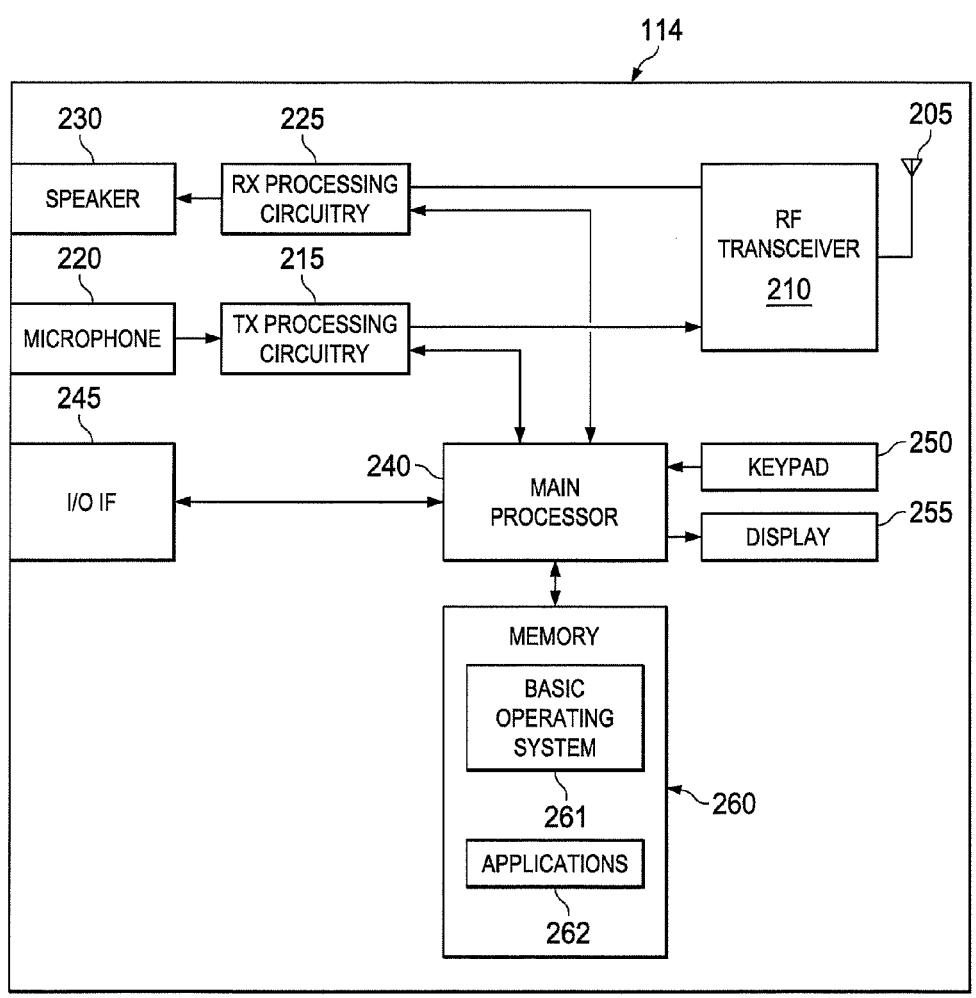
FIG. 2 illustrates an example user equipment (UE) according to this disclosure.

FIG. 2 illustrates an example UE 114 according to this disclosure. The embodiment of the UE 114 shown in FIG. 2 is for illustration only, and the other UEs in FIG. 1 could have the same or similar configuration. However, UEs come in a wide variety of configurations, and FIG. 2 does not limit the scope of this disclosure to any particular implementation of a UE.

As shown in FIG. 2, the UE 114 includes an antenna 205, a radio frequency (RF) transceiver 210, transmit (TX) processing circuitry 215, a microphone 220, and receive (RX) processing circuitry 225. The UE 114 also includes a speaker 230, a main processor 240, an input/output (I/O) interface (IF) 245, a keypad 250, a display 255, and a memory 260. The memory 260 includes a basic operating system (OS) program 261 and one or more applications 262.

The RF transceiver 210 receives, from the antenna 205, an incoming RF signal transmitted by an eNB or another UE. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the main processor 240 for further processing (such as for web browsing data).

The TX processing circuitry 215 receives analog or digital voice data from the microphone 220 or other outgoing baseband data (such as web data, e-mail, or interactive video game data) from the main processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The main processor 240 can include one or more processors or other processing devices and can execute the basic OS program 261 stored in the memory 260 in order to control the overall operation of the UE 114. For example, the main processor 240 could control the reception of forward channel signals and the transmission of reverse channel signals by the RF transceiver 210, the RX processing circuitry 225, and the TX processing circuitry 215 in accordance with well-known principles. In some embodiments, the main processor 240 includes at least one microprocessor or microcontroller.

The main processor 240 is also capable of executing other processes and programs resident in the memory 260. The main processor 240 can move data into or out of the memory 260 as required by an executing process. In some embodiments, the main processor 240 is configured to execute the applications 262 based on the OS program 261 or in response to signals received from eNBs, other UEs, or an operator. The main processor 240 is also coupled to the I/O interface 245, which provides the UE 114 with the ability to connect to other devices such as laptop computers and handheld computers. The I/O interface 245 is the communication path between these accessories and the main processor 240.

The main processor 240 is also coupled to the keypad 250 and the display unit 255. The operator of the UE 114 can use the keypad 250 to enter data into the UE 114. The display 255 may be a liquid crystal display or other display capable of rendering text and/or at least limited graphics, such as from web sites. The display 255 could also represent a touch-screen.

The memory 260 is coupled to the main processor 240. Part of the memory 260 could include a broadcast signaling memory (RAM), and another part of the memory 260 could include a Flash memory or other read-only memory (ROM).

As described in more detail below, the transmit and receive paths of the UE 114 (implemented using the RF transceiver 210, TX processing circuitry 215, and/or RX processing circuitry 225) support broadcast signaling in a normal mode or in an enhanced coverage mode.

Although FIG. 2 illustrates one example of UE 114, various changes may be made to FIG. 2. For example, various components in FIG. 2 could be combined, further subdivided, or omitted and additional components could be added according to particular needs. As a particular example, the main processor 240 could be divided into multiple processors, such as one or more central processing units (CPUs) and one or more graphics processing units (GPUs). Also, while FIG. 2 illustrates the UE 114 configured as a mobile telephone or smart-phone, UEs could be configured to operate as other types of mobile or stationary devices. In addition, various components in FIG. 2 could be replicated, such as when different RF components are used to communicate with the eNBs 101-103 and with other UEs.

Figure 3:
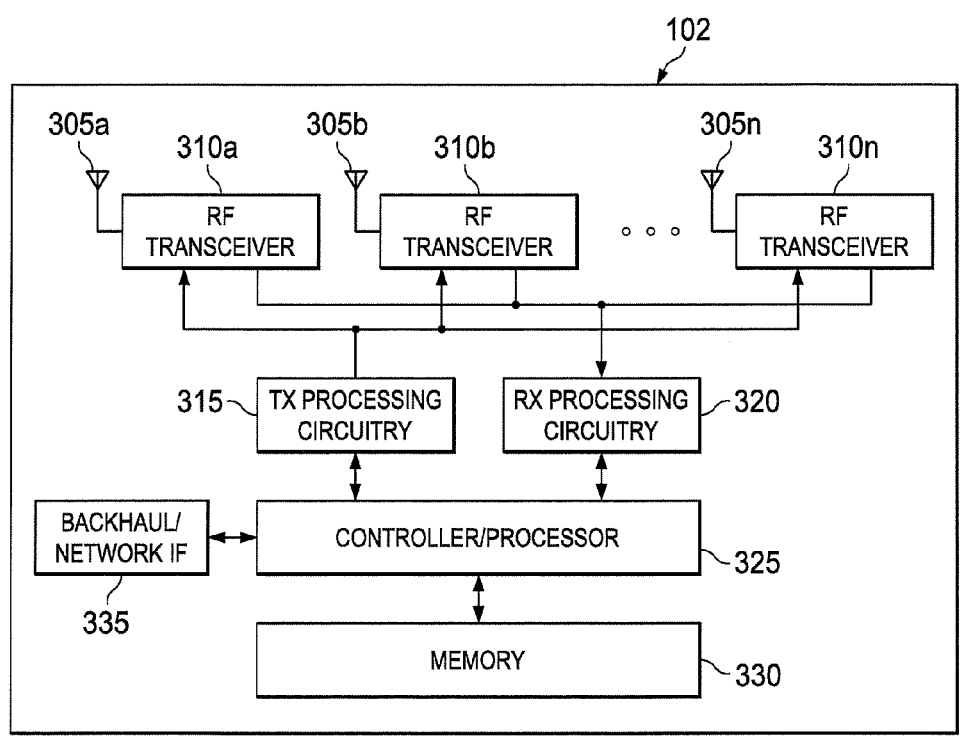
FIG. 3 illustrates an example enhanced NodeB (eNB) according to this disclosure.

FIG. 3 illustrates an example eNB 102 according to this disclosure. The embodiment of the eNB 102 shown in FIG. 3 is for illustration only, and other eNBs of FIG. 1 could have the same or similar configuration. However, eNBs come in a wide variety of configurations, and FIG. 3 does not limit the scope of this disclosure to any particular implementation of an eNB.

As shown in FIG. 3, the eNB 102 includes multiple antennas 305a-305n, multiple RF transceivers 310a-310n, transmit (TX) processing circuitry 315, and receive (RX) processing circuitry 320. The eNB 102 also includes a controller/processor 325, a memory 330, and a backhaul or network interface 335.

The RF transceivers 310a-310n receive, from the antennas 305a-305n, incoming RF signals, such as signals transmitted by UEs or other eNBs. The RF transceivers 310a-310n down-convert the incoming RF signals to generate IF or baseband signals. The IF or baseband signals are sent to the RX processing circuitry 320, which generates processed baseband signals by filtering, decoding, and/or digitizing the baseband or IF signals. The RX processing circuitry 320 transmits the processed baseband signals to the controller/processor 325 for further processing.

The TX processing circuitry 315 receives analog or digital data (such as voice data, web data, e-mail, or interactive video game data) from the controller/processor 325. The TX processing circuitry 315 encodes, multiplexes, and/or digitizes the outgoing baseband data to generate processed baseband or IF signals. The RF transceivers 310a-310n receive the outgoing processed baseband or IF signals from the TX processing circuitry 315 and up-converts the baseband or IF signals to RF signals that are transmitted via the antennas 305a-305n.

The controller/processor 325 can include one or more processors or other processing devices that control the overall operation of the eNB 102. For example, the controller/processor 325 could control the reception of forward channel signals and the transmission of reverse channel signals by the RF transceivers 310a-310n, the RX processing circuitry 320, and the TX processing circuitry 315 in accordance with well-known principles. The controller/processor 325 could support additional functions as well, such as more advanced wireless communication functions. For instance, the controller/processor 325 could support beam forming or directional routing operations in which outgoing signals from multiple antennas 305a-305n are weighted differently to effectively steer the outgoing signals in a desired direction. Any of a wide variety of other functions could be supported in the eNB 102 by the controller/processor 325. In some embodiments, the controller/processor 325 includes at least one microprocessor or microcontroller.

The controller/processor 325 is also capable of executing programs and other processes resident in the memory 330, such as a basic OS. The controller/processor 325 can move data into or out of the memory 330 as required by an executing process.

The controller/processor 325 is also coupled to the backhaul or network interface 335. The backhaul or network interface 335 allows the eNB 102 to communicate with other devices or systems over a backhaul connection or over a network. The interface 335 could support communications over any suitable wired or wireless connection(s). For example, when the eNB 102 is implemented as part of a cellular communication system (such as one supporting 5G, LTE, or LTE-A), the interface 335 could allow the eNB 102 to communicate with other eNBs over a wired or wireless backhaul connection. When the eNB 102 is implemented as an access point, the interface 335 could allow the eNB 102 to communicate over a wired or wireless local area network or over a wired or wireless connection to a larger network (such as the Internet). The interface 335 includes any suitable structure supporting communications over a wired or wireless connection, such as an Ethernet or RF transceiver.

The memory 330 is coupled to the controller/processor 325. Part of the memory 330 could include a RAM, and another part of the memory 330 could include a Flash memory or other ROM.

As described in more detail below, the transmit and receive paths of the eNB 102 (implemented using the RF transceivers 310a-310n, TX processing circuitry 315, and/or RX processing circuitry 320) support broadcast signaling in a normal mode or in an enhanced coverage mode.

Although FIG. 3 illustrates one example of an eNB 102, various changes may be made to FIG. 3. For example, the eNB 102 could include any number of each component shown in FIG. 3. As a particular example, an access point could include a number of interfaces 335, and the controller/processor 325 could support routing functions to route data between different network addresses. As another particular example, while shown as including a single instance of TX processing circuitry 315 and a single instance of RX processing circuitry 320, the eNB 102 could include multiple instances of each (such as one per RF transceiver).

In some wireless networks, DL signals include data signals conveying information content, control signals conveying DL Control Information (DCI), and Reference Signals (RS), which are also known as pilot signals. DL signals can be transmitted using Orthogonal Frequency Division Multiplexing (OFDM). An eNB, such as eNB 102, can transmit data information or DCI through respective Physical DL Shared CHannels (PDSCHs) or Physical DL Control CHannels (PDCCHs) or Enhanced PDCCHs (EPDCCHs)—see also REF 1. The eNB, such as eNB 102, can transmit one or more of multiple types of RS, including a UE-Common RS (CRS), a Channel State Information RS (CSI-RS), and a DeModulation RS (DMRS)—see also REF 1. A CRS can be transmitted over a DL system BandWidth (BW) and can be used by UEs, such as UE 114 or UE 116, to demodulate data or control signals or to perform measurements. To reduce CRS overhead, eNB 102 can transmit a CSI-RS with a smaller density in the time or frequency domain than a CRS. For Interference Measurements (IMs), CSI-IM resources associated with a Zero Power CSI-RS (ZP CSI-RS) can be used. A UE, such as UE 114 or UE 116, can determine CSI-RS transmission parameters through higher-layer signaling, such as Radio Resource Control (RRC) signaling (see also REF 5) from an eNB, such as eNB 102. DMRS is transmitted only in the BW of a respective PDSCH or PDCCH, and a UE can use the DMRS to demodulate information in a PDSCH or PDCCH. eNB 102 can also indicate to UEs, through a System Information Block (SIB), that a DL Sub-Frame (SF), in a period of 10 successive SFs that is referred to as a frame, is configured as a Multicast-Broadcast Single Frequency Network (MBSFN) SF (see also REF 1).

To assist cell search and synchronization, an eNB, such as eNB 102, can transmit synchronization signals such as a Primary Synchronization Signal (PSS) and a Secondary Synchronization Signal (SSS) in a serving cell. Although having a same structure, the time-domain positions of synchronization signals within a frame that includes ten SFs can differ depending on whether a cell is operating in Frequency Division Duplex (FDD) or Time Division Duplex (TDD). Therefore, after acquiring the synchronization signals, a UE, such as UE 114 or UE 116, can determine whether a cell operates in FDD or in TDD and a SF index within a frame. The PSS and SSS occupy the central 72 sub-carriers, also referred to as Resource Elements (REs), of a DL operating bandwidth. Additionally, the PSS and SSS can inform of a Physical Cell IDentifier (PCID) for a cell and therefore, after acquiring the PSS and SSS, UE 114 or UE 116 can know the PCID of the transmitting cell.

Figure 4:
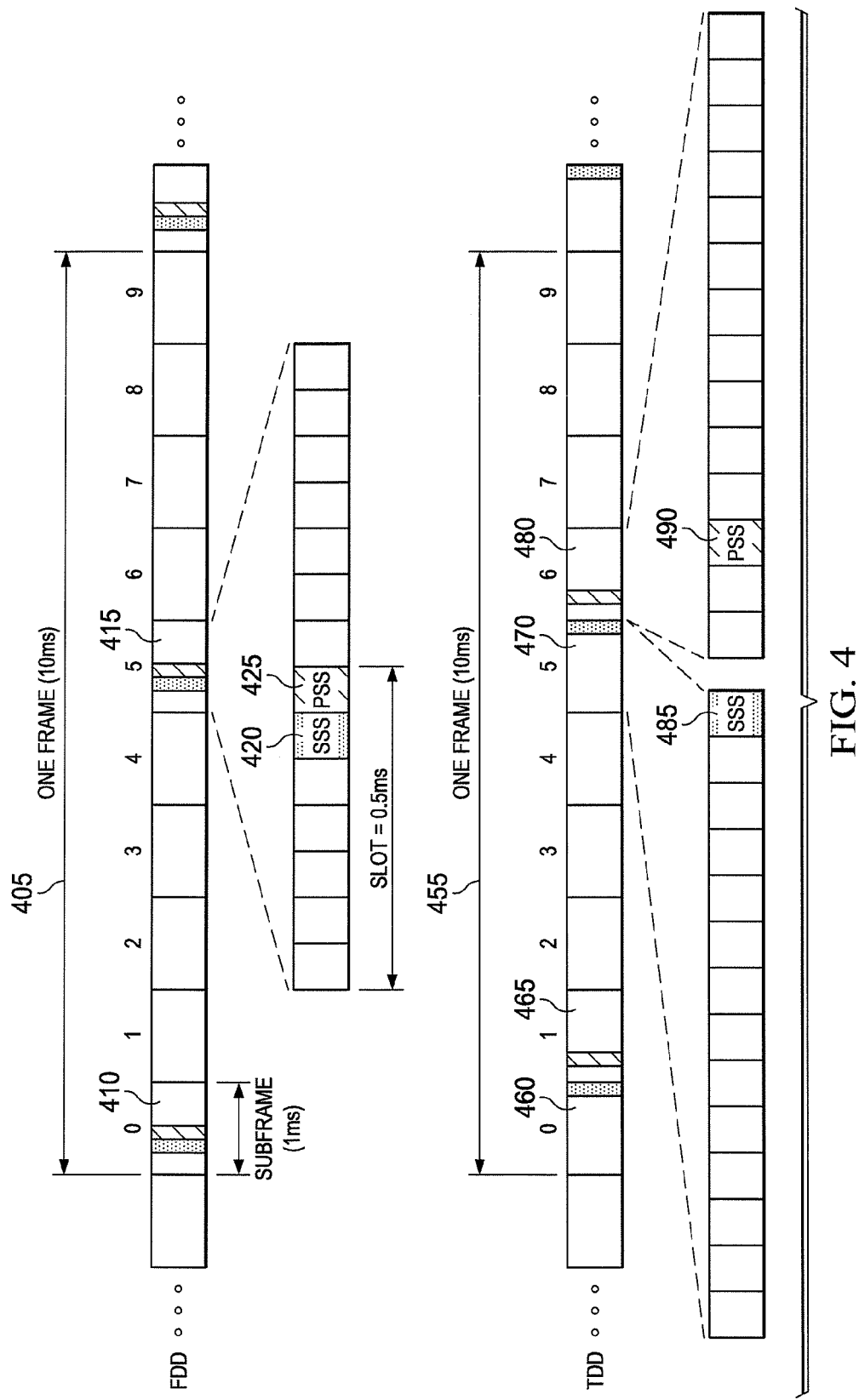
FIG. 4 illustrates example time domain positions for PSS and SSS for FDD and TDD according to this disclosure.

FIG. 4 illustrates example time domain positions for PSS and SSS for FDD and TDD according to this disclosure. The embodiments of the time domain positions for PSS and SSS shown in FIG. 4 are for illustration only. Other embodiments could be used without departing from the scope of the present disclosure.

As shown in FIG. 4, in case of FDD, in every frame 405, eNB 102 transmits a PSS 425 within a last symbol of a first slot of SF#0 and SF#5 (410 and 415), wherein a SF includes two slots, and a SSS 420 within a second last symbol of a same slot. In case of TDD, in every frame 455, eNB 102 transmits a PSS 490 within a third symbol of SF#1 and SF#6 (465 and 480) and a SSS 485 in a last symbol of SF#0 and SF#5 (460 and 470). The difference allows UE 114 or UE 116 to detect the duplex scheme on a cell. The REs used by eNB 102 to transmit PSS and SSS are not available for transmission of any other DL signaling.

A logical channel that carries system control information is referred to as Broadcast Control CHannel (BCCH). A BCCH is mapped to either a transport channel referred to as a Broadcast CHannel (BCH) or to a DL-Shared CHannel (DL-SCH). A BCH is mapped to a physical channel referred to as Physical BCH (PBCH). A DL-SCH is mapped to PDSCH. A Master Information Block (MIB) is transmitted using BCH while other System Information Blocks (SIBs) are provided using DL-SCH. After UE 116 acquires a PCID for a cell, UE 116 can perform DL channel measurement using a CRS to decode PBCH and PDSCH.

A MIB includes a minimal amount of system information that is needed for UE 116 to receive remaining system information provided by DL-SCH. More specifically, a MIB has predefined format and includes information of DL bandwidth, Physical Hybrid-ARQ Indicator Channel (PHICH, 3-bit), System Frame Number (SFN) (Most Significant Bits (MSBs) 8-bit) and 10 spare bits that UE 116 can assume to all have a predetermined value such as '0' (see also REF 5). UE 116 needs to know a PHICH configuration to be able to receive PDCCH which, in turn, is typically needed to receive DL-SCH. A PHICH configuration includes a number of groups used to transmit a PHICH and a number of SF symbols for a PHICH transmission (see also REF 3). A UE can indirectly acquire the two Least Significant Bits (LSBs) of a SFN after BCH decoding. A PBCH is transmitted using a minimum bandwidth of 1.08 MHz in the central part of a DL operating bandwidth of the cell and over four SFs in successive frames where each SF is a first SF of a frame. The 40 msec timing is detected blindly without requiring explicit signaling. Also, in each SF, a PBCH transmission is self-decodable and UEs with good channel conditions may detect a PBCH in less than four SFs. Each individual PBCH transmission within a frame, from a period of four frames, is referred to as PBCH segment. To decode a PBCH segment, a UE can attempt four different decoding operations corresponding to the four different possibilities for the scrambling code conveying the two LSBs of the SFN.

The UE can also combine PBCH receptions in successive frames to improve a detection probability for the MIB provided that the successive frames convey the same MIB. In practice, this means that the successive frames are in a same quadruple of frames and the MIB includes the same SFN. For the remaining of this disclosure, the capability for a UE to combine, prior to decoding, PBCH receptions across successive frames and perform multiple decoding operations corresponding to the hypotheses for the scrambling code conveying the two LSBs of the SFN and for the successive frames to belong in a same quadruple of frames is assumed unless otherwise noted.

Most system information is included in different SIBs (see also REF 5). An eNB, such as eNB 102, transmits SIBs using respective DL-SCHs. A presence of system information on a DL-SCH in a SF is indicated by a transmission of a corresponding PDCCH conveying a codeword with a CRC scrambled with a System Information RNTI (SI-RNTI). SIB1 mainly includes information related to whether a UE is allowed to camp on a respective cell. In case of TDD, SIB1 also includes information about an allocation of UL/DL SFs and configuration of a special SF (see also REF 1). SIB1 is always transmitted in SF#5. A set of Resource Blocks (RBs) in a DL bandwidth over which SIB1 is transmitted, where each RB includes twelve consecutive REs, as well as other aspects of an associated transport format, can vary as signaled on an associated PDCCH. SIB1 also includes information about a time-domain scheduling of remaining SIBs (SIB2 and beyond). SIB2 includes information that UEs need to obtain in order to be able to access a cell, including an UL cell bandwidth, random-access parameters, and parameters related to UL power control. SIB3-SIB13 mainly include information related to cell reselection, neighboring-cell-related information, public warning messages, and so on.

Figure 5A:
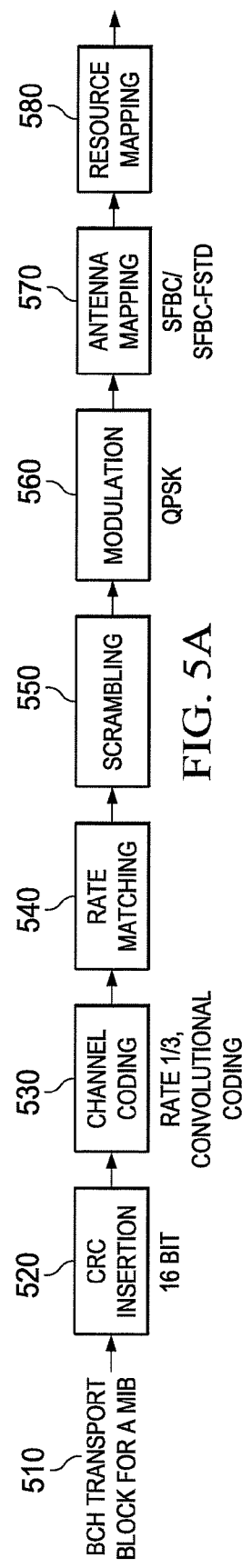
FIG. 5A illustrates an example Physical Broadcast Channel (PBCH) transmitter according to this disclosure.

FIG. 5A illustrates an example PBCH transmitter according to this disclosure. The embodiment of the PBCH transmitter shown in FIG. 5A is for illustration only. Other embodiments could be used without departing from the scope of the present disclosure.

As shown in FIG. 5, eNB 102 first processes a BCH transport block corresponding to a MIB 510 by including a 16-bit CRC 520 followed by channel coding 530 using a rate-1/3 tail-biting convolutional code, rate matching 540, and bit-level scrambling 550. Subsequently, eNB 102 applies QPSK modulation 560 to a coded and scrambled BCH transport block. In case eNB 102 includes more than one transmitter antenna ports, eNB 102 can transmit the BCH using multi-antenna transmission 570 such as transmitter antenna diversity. For example, Space-Frequency Block Coding (SFBC) can be used in case of two antenna ports and combined SFBC/Space-Frequency Time Diversity (FSTD) in case of four antenna ports. By blindly detecting a transmitter antenna diversity scheme used for PBCH, UE 116 can determine a number of cell-specific antenna ports and also a transmitter antenna diversity scheme used for control signaling. Finally, eNB 102 applies resource mapping 580 and transmits the PBCH.

Figure 5B:
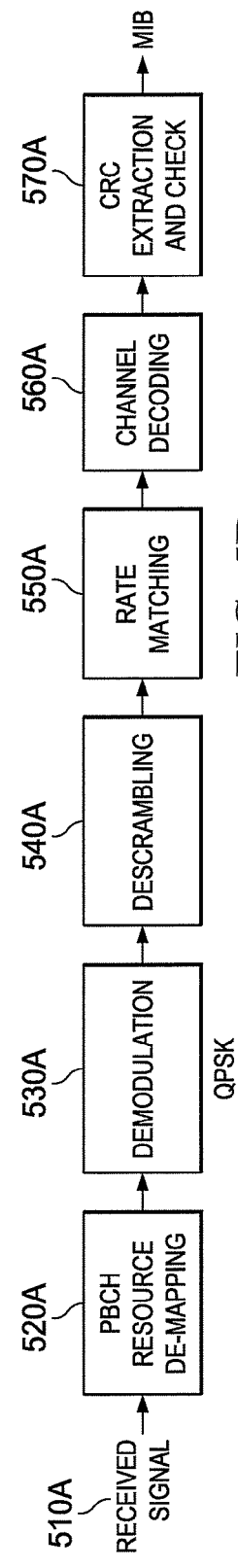
FIG. 5B illustrates a PBCH receiver according to this disclosure.

FIG. 5B illustrates a PBCH receiver according to this disclosure. The embodiment of the PBCH receiver shown in FIG. 5B is for illustration only. Other embodiments could be used without departing from the scope of the present disclosure.

Referring to FIG. 5B, UE 116 receives a signal 510A transmitted by eNB 102 in a first SF of a frame, a de-mapper performs de-mapping of resources (REs) that eNB 102 used to transmit PBCH 520A, a demodulator demodulates PBCH symbols 530A, a descrambler descrambles the demodulated PBCH symbols 540A followed by a rate matching unit 550A and finally by a channel decoder 560A and a CRC extraction and check unit 570A. If the CRC check is positive, UE 116 considers that it detected the MIB; otherwise, UE 116 attempts a new PBCH decoding. The new PBCH decoding can correspond to a different hypothesis for the scrambling code conveying the LSBs of the SFN or can correspond to combined PBCH receptions in multiple successive frames.

Figure 6:
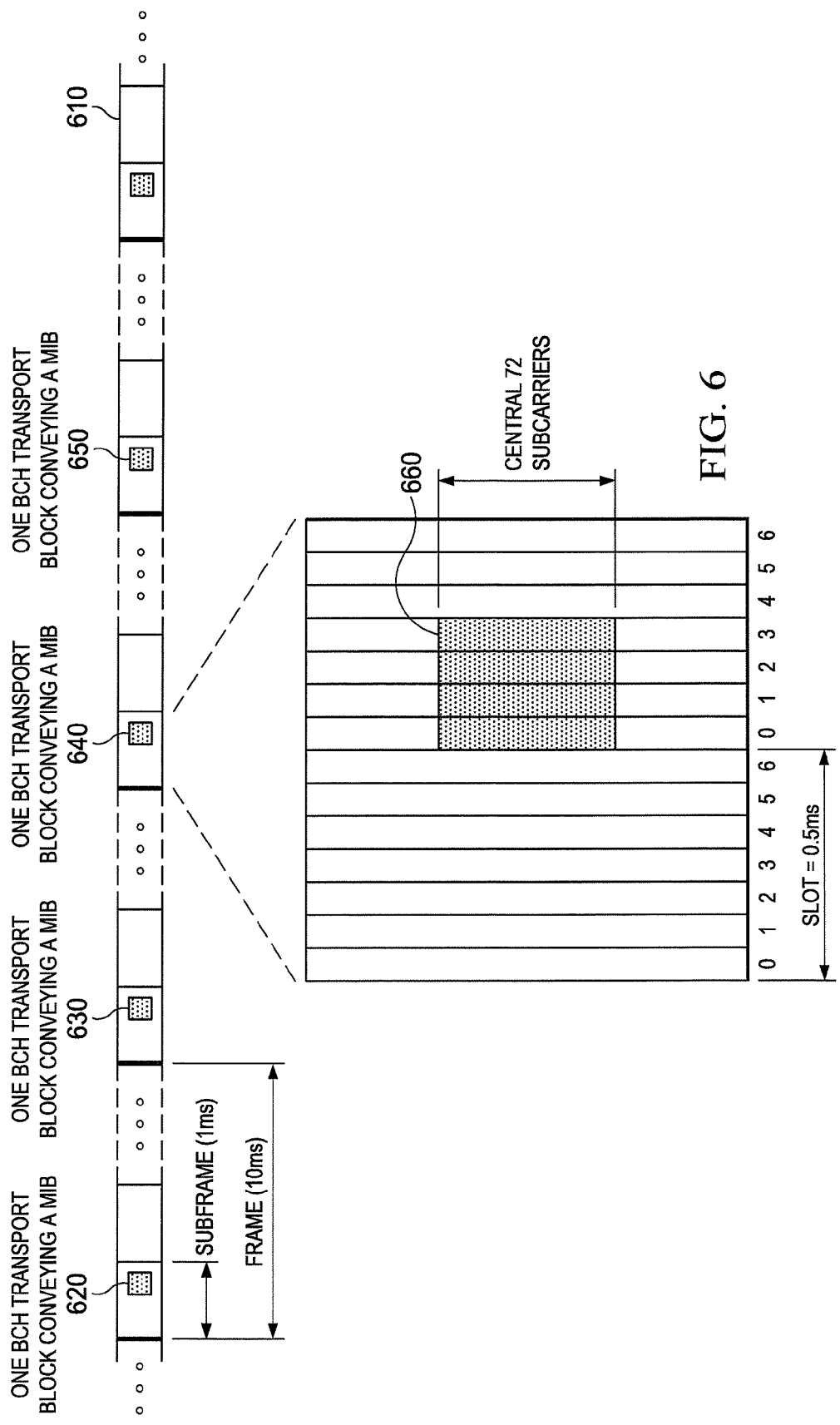
FIG. 6 illustrates an example PBCH resource mapping according to this disclosure.

FIG. 6 illustrates an example PBCH resource mapping according to this disclosure. The embodiment of the PBCH resource mapping shown in FIG. 6 is for illustration only. Other embodiments could be used without departing from the scope of the present disclosure.

As shown in FIG. 6, eNB 102 transmits one BCH transport block, corresponding to a MIB, every 40 msec or, equivalently, every 4 frames. Therefore, a BCH Transmission Time Interval (TTI) is 40 msec. The eNB 102 maps a coded BCH transport block to a first SF 610 of each frame in four consecutive frames 620, 630, 640, 650. A PBCH is transmitted within a first four symbols of a second slot of SF#0 and over the 72 center REs (6 RBs) 660. In FDD, a PBCH transmission follows immediately after a PSS and SSS transmission in SF#0.

Figure 7:
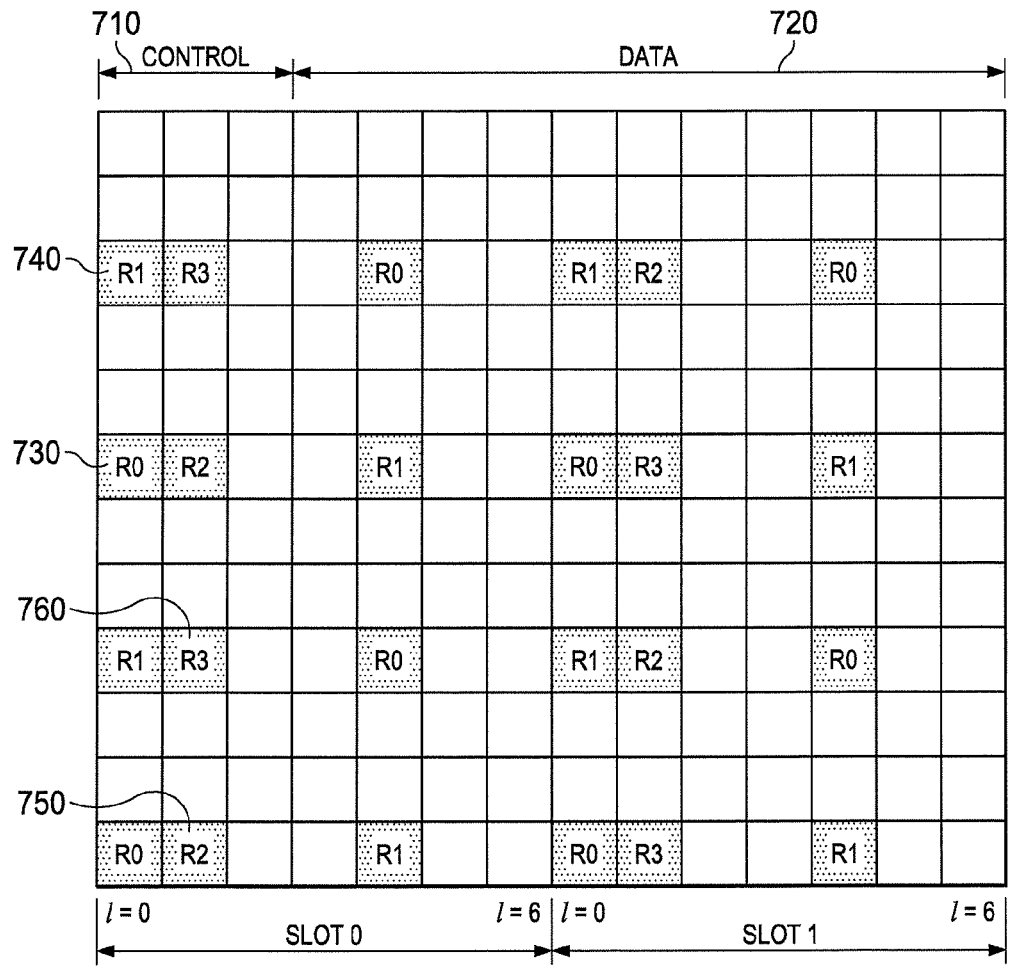
FIG. 7 illustrates an example Common Reference Signal (CRS) mapping in a Resource Block (RB) of a Sub-Frame (SF) according to this disclosure.

FIG. 7 illustrates an example CRS mapping in a RB of a SF according to this disclosure. The embodiment of the CRS mapping in a RB shown in FIG. 7 is for illustration only. Other embodiments could be used without departing from the scope of the present disclosure.

As shown in FIG. 7, for a SF with a control region of 3 symbols 710 and a data region of 11 symbols 720, CRS can be mapped for antenna ports 0-3, with R0-R3 (730-760), respectively. For the PBCH transmission symbols in FIG. 6, UE 116 assumes that the first and second SF symbols have CRS for R0-R1 and R2-R3, respectively, regardless of an actual number of CRS antenna ports used by eNB 102 that can be either 1, or 2, or 4.

One of the fundamental requirements in an operation of a communication system is a capability for a UE to request a connection setup; such request is commonly referred to as random access. Random access is used for several purposes including initial access when establishing a radio link, re-establishing a radio link after radio-link failure, handover when UL synchronization needs to be established to a new cell, UL synchronization, UE positioning based on UL measurements, and as a Scheduling Request (SR) if no dedicated SR resources are configured to a UE. Acquisition of UL timing by a serving eNB is one main objective of random access; when establishing an initial radio link, a random-access process also serves for assigning a unique identity, referred to as Cell Radio Network Temporary Identifier (C-RNTI), to a UE. A random access scheme can be either contention based (multiple UEs can use same resources) or contention-free (a dedicated resource is used by a UE)—see also REF 1 and REF 3.

Figure 8:
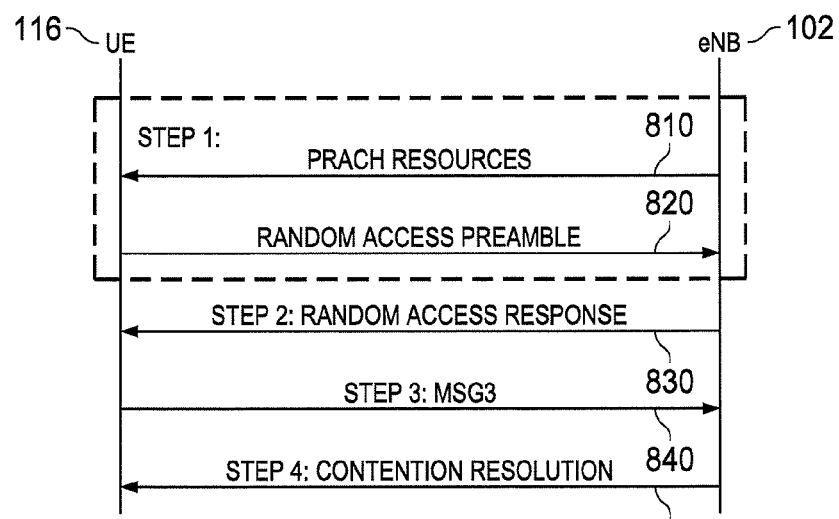
FIG. 8 illustrates steps for a random access process according to this disclosure.

FIG. 8 illustrates steps for a random access process according to this disclosure. While the signaling diagram depicts a series of sequential signals, unless explicitly stated, no inference should be drawn from that sequence regarding specific order of performance, performance of signals (or steps) or portions thereof serially rather than concurrently or in an overlapping manner, or performance of the signals depicted exclusively without the occurrence of intervening or intermediate steps. The process depicted in the example depicted is implemented by a transmitter chain and receiver chains in, for example, a mobile station and base station.

As shown in FIG. 8, in Step 1, UE 116 acquires information of Physical Random Access CHannel (PRACH) resources 810 from eNB 102 and determines PRACH resources for a transmission of a Random-Access (RA) preamble 820 (also referred to as PRACH preamble). In Step 2, UE 116 receives a Random Access Response (RAR) 830 from eNB 102. In Step 3, UE 116 transmits a Message 3 (Msg3) 840 to eNB 102. In Step 4, eNB 102 and UE 114 perform contention resolution 850 and a respective message is referred to as Message 4 (Msg4).

The four steps in FIG. 8 are now described in detail. In Step 1, UE 116 acquires a SIB that conveys information for PRACH resources as well as RA preamble format (see also REF 1). PRACH resources consist of a set of SFs where UE 116 can transmit a PRACH of a set of RBs where UE 116 can transmit a PRACH and of a number of Zadoff-Chu (ZC) sequences from which UE 116 can select to generate and transmit a RA preamble (see also REF 1) thereby allowing eNB 102 to estimate transmission timing for UE 116. UL synchronization is necessary as otherwise UE 116 cannot properly communicate other UL signaling to eNB 102.

In Step 2, upon detecting a RA preamble transmitted from UE 116, eNB 102 transmits a RAR including a Timing Advance (TA) command for UE 116 to adjust its transmission timing. eNB 102 also transmits an UL grant assigning UL resources for UE 116 to transmit Msg3 and a Temporary C-RNTI (TC-RNTI). Failing to detect a transmitted RA preamble in a RAR within a RAR time window configured by eNB 102, UE 116 can transmit a new RA preamble and repeat the first step. UE 116 can also apply power ramping to its RA preamble transmission if it does not detect a RAR for its RA preamble transmission. In Step 3, UE 116 transmits Msg3 in a PUSCH where Msg3 can include a TC-RNTI. The contents of Msg3 can depend on the state of UE 116 and in particular on whether or not UE 116 is connected to eNB 102. In Step 4, eNB 102 transmits a contention-resolution message to UE 116 in a PDSCH. Step 4 resolves any contention issue that can arise when multiple UEs try to access a network using a same RA preamble. Once a random access process is successful, the TC-RNTI is converted to C-RNTI.

Contention-free random access can only be used for reestablishing UL synchronization upon DL data arrival, handover, and positioning (see also REF 5). Only Step 1 and Step 2 of the random access process in FIG. 8 are used as there is no need for contention resolution in a contention-free scheme where Step 2 can deliver C-RNTI instead of TC-RNTI.

In a TDD communication system, a communication direction in some SFs in a frame is in the DL and in some other SFs is in the UL. Table 1 provides indicative TDD UL-DL configurations over a period of a frame. In Table 1, "D" denotes a DL SF, "U" denotes an UL SF, and "S" denotes a special SF that includes a DL transmission field referred to as DwPTS, a Guard Period (GP), and an UL transmission field referred to as UpPTS (see also REF 1). Several combinations exist for the duration of each field in a special SF subject to a condition that a total duration is one SF (1 msec).

TABLE 1

TDD UL/DL configurations

| TDD UL/DL Configuration | DL-to-UL Switch-point periodicity | SF number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Table 2 provides a special SF configuration in terms of a number of symbols for DwPTS, GP, and UpPTS.

TABLE 2

TDD special subframe configurations

| DwPTS | 12 | 11 | 10 | | 9 | | 6 | | 3 | |
|---|---|---|---|---|---|---|---|---|---|---|
| GP | 1 | 1 | 2 | 2 | 3 | 3 | 4 | 6 | 9 | 10 |
| UpPTS | 1 | 2 | 1 | 2 | 2 | 2 | 1 | 2 | 2 | 1 |

A DL SF can be a unicast SF or it can be a Multicast-Broadcast Single Frequency Network (MBSFN) SF. Each DL SF (including the DwPTS of a special SF in case of TDD) is typically divided into a control region, consisting of first few SF symbols, and a data region consisting of a remaining SF symbols. A unicast DL SF has a control region of 1, 2, or 3 symbols (or 2, 3, or 4 symbols for small DL operating bandwidths) while an MBSFN SF has a unicast control region of one or two SF symbols followed by an MBSFN region having contents that depend on a usage type for the MBSFN SF. Information about a set of SFs configured as MBSFN SFs in a cell is provided as part of the system information. In principle, an arbitrary pattern of MBSFN SFs can be configured with a pattern repeating after 40 msec. However, SFs where information necessary to operate a network (specifically, synchronization signals, system information, and paging) needs to be transmitted cannot be configured as MBSFN SFs. Therefore, SF#0, SF#4, SF#5, and SF#9 for FDD and SF#0, SF#1, SF#5, and SF#6 for TDD are always unicast SFs and cannot be configured as MBSFN SFs (see also REF 3 or REF 5).

In Time Domain Multiplexing (TDM) for Inter-Cell Interference Coordination (ICIC), other than regular SFs, another type of SF, referred to as Almost Blank Subframe (ABS), can be used in order to mitigate inter-cell interference (see also REF 3 and REF 5). In ABS, a cell may assume that an interfering cell does not transmit signaling in all SF symbols other than the first symbol. Compared to a regular SF, a transmission power from an interfering cell in an ABS can be considerably reduced.

Figure 9:
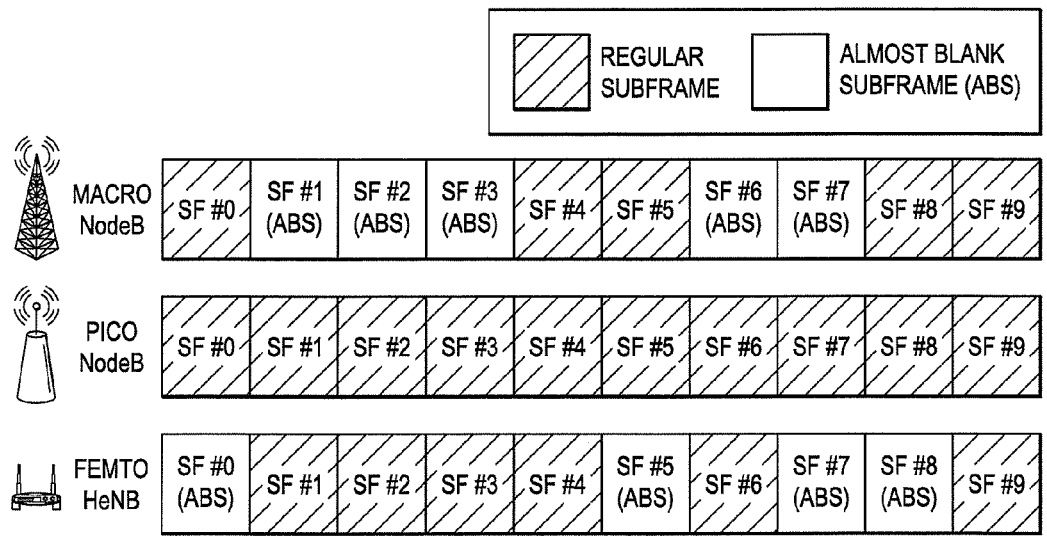
FIG. 9 illustrates an example of Time Domain Multiplexing-Inter-Cell Interference Coordination (TDM-ICIC) in a co-channel deployment for a macro-cell, a pico-cell, and a femto-cell Home eNB (HeNB) according to this disclosure.

FIG. 9 illustrates an example of TDM-ICIC in a co-channel deployment for a macro-cell, a pico-cell, and a femto-cell Home eNB (HeNB) according to this disclosure. The embodiment of the TDM-ICIC shown in FIG. 9 is for illustration only. Other embodiments could be used without departing from the scope of the present disclosure.

Referring to FIG. 9, in a frame that includes ten SFs (SFs #0-9), SF#1, SF#2, SF#3, SF#6, and SF#7 are ABSs for the macro eNB, and SF#0, SF#5, and SF#8 are ABSs for the HeNB. This allows the pico eNB to serve its UEs with reduced interference during ABS in interfering eNB thereby improving a reception performance for its serving UEs.

In order to obtain performance benefits from TDM-ICIC, an eNB scheduler uses ABS patterns at interfering transmitting nodes in order to perform a link adaptation. In FDD, an ABS pattern is periodic with a period that is an integer multiple of 40 SFs (4 frames). In TDD, the ABS pattern period depends on a respective TDD UL-DL configuration. ABS patterns are configured and signaled between nodes over an X2 interface or via a HeNB gateway if an X2 interface is not available. Since a period of an ABS pattern is an integer multiple of 40 msec, X2 signaling uses a bit-map of a same length as the ABS pattern.

For Machine-Type Communication (MTC), it is more efficient to use an already deployed radio access technology and exploit economies of scale to control cost rather than create a new radio access technology. MTC UEs typically require low operational power consumption and are expected to communicate with infrequent small burst transmissions. In addition, MTC UEs can be deployed deep inside buildings, which can require significant Coverage Enhancement (CE) relative to a conventional cell coverage footprint.

As MTC UEs can be installed in basements of residential buildings or, generally, in locations experiencing significantly larger penetration losses than conventional UEs, in extreme coverage scenarios MTC UEs can have characteristics such as very low data rate, greater delay tolerance, and limited or no mobility, thereby potentially being capable to operate without some messages/channels. MTC needs to be supported in both FDD and TDD systems. Required system functionalities for MTC UEs, but also for conventional UEs in general, in a CE operating mode are assumed to include synchronization, cell search, power control, random access process, channel estimation, measurement reporting, and DL/UL data transmission (including DL/UL resource allocation). Not all MTC UEs require CE or require a same amount of CE. Conversely, conventional UEs can also require CE. Therefore, as CE for physical channels consume additional resources and consequently result to lower spectral efficiency, it should be possible to enable associated techniques only for UEs that require such CEs.

Existing designs may not satisfy a required CE level for all deployment scenarios of UEs in general and MTC UEs in particular as a CE as high as, for example, 15 deciBell (dB) can be required for UEs located in environments with severe propagation loss to a serving eNB. In addition, a required CE level can be different for different eNBs, for example depending on an eNB transmission power or an associated cell size, as well as for different UEs, for example depending on a location of a UE or on a number of UE receiver antennas.

Embodiments of this disclosure provide mechanisms to support scalable CE levels for broadcast signaling according to a CE level required in a cell. Embodiments of this disclosure also provide mechanisms for CE of broadcast system information including MIB and SIBs. Additionally, embodiments of this disclosure provide mechanisms to maximize commonalties in supporting CE for broadcast signaling in a FDD system and a TDD system in order to minimize an associated design cost. Further, embodiments of this disclosure provide mechanisms to support CE for broadcast signaling in conjunction with a configuration of ABS for TDM ICIC or with a configuration of MBSFN SFs.

The following embodiments are not limited to MTC UEs and can be applicable to any type of UEs requiring an enhancement in coverage beyond a coverage supported by a conventional operation. Moreover, although the descriptions consider SF structures with symbols having a normal Cyclic Prefix (CP), they are also applicable for SF structures with symbols having a extended CP (see also REF 1).

In certain embodiments, designs for supporting scalable CE levels for a PBCH are provided.

For either a TDD system or a FDD system, a transmission of a PBCH segment in a frame can be repeated multiple times in order to provide a respective CE. A resulting PBCH is referred to as CE-PBCH. The eNB 102 can transmit each CE-PBCH segment over a larger number of SFs than a PBCH segment but, as for the PBCH, the CE-PBCH is transmitted only in the central 72 sub-carriers (6 RBs) of a DL operating bandwidth. A CE-PBCH conveys a CE-MIB that can have a same content as the MIB conveyed by the PBCH. This enables a coverage limited UE, such as UE 114, to combine a PBCH reception with a reception of CE-PBCH repetitions prior to decoding. Alternatively, the CE-MIB can have different, including reduced, content than the MIB (for example, if PHICH-related information that exists in the MIB is omitted from the CE-MIB). Then, it is not meaningful for UE 114 to combine a reception of CE-PBCH repetitions with a PBCH reception prior to decoding as the PBCH cannot be considered as another repetition of the CE-PBCH.

Figure 10:
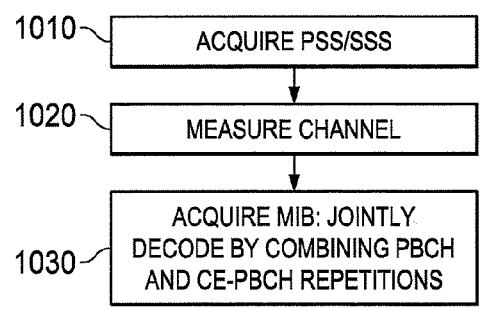
FIG. 10 illustrates example operations for coverage limited UE to detect a Coverage Enhancement-Master Information Block (CE-MIB) according to this disclosure.

FIG. 10 illustrates example operations for coverage limited UE to detect a CE-MIB according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a mobile station.

Referring to FIG. 10, in operation 1010, the UE 114 first acquires PSS/SSS transmitted by eNB 102, determines whether a respective cell uses FDD or TDD, and then estimates a DL channel medium in operation 1020. Finally, UE 114 acquires and decodes a CE-MIB by combining a reception of a PBCH (if the MIB and the CE-MIB have the same contents) with a reception of CE-PBCH repetitions in operation 1030. For detecting the CE-MIB, the UE 114 considers the PBCH not as a separate channel but instead as a repetition of the CE-PBCH. Each CE-PBCH repetition in a frame is self-decodable. The UE 114 detects the CE-MIB over a subset of CE-PBCH repetitions in a frame or in a subset of the four frames where the transmission of the CE-MIB is repeated.

Figure 11A:
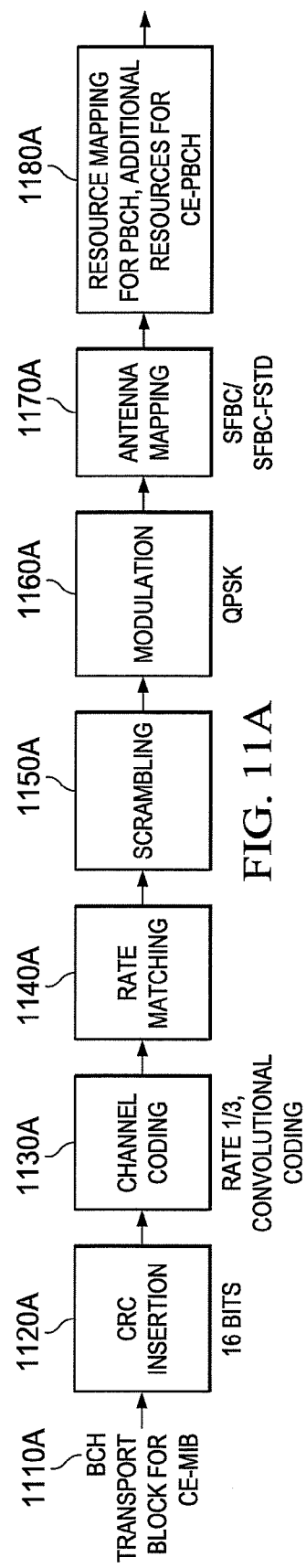
FIG. 11A illustrates a CE-PBCH transmitter according to this disclosure.

FIG. 11A illustrates a CE-PBCH transmitter according to this disclosure. The embodiment of the CE-PBCH transmitter shown in FIG. 11A is for illustration only. Other embodiments could be used without departing from the scope of the present disclosure.

Referring to FIG. 11A, eNB 102 transmitter processing blocks 1110A-1170A are similar to the blocks 510-570 in FIG. 5 respectively, and their description is not repeated here. In processing block 1180A, a mapper maps resources (REs) either to PBCH ones or to additional ones for repetitions of a CE-PBCH transmission conveying a CE-MIB.

Figure 11B:
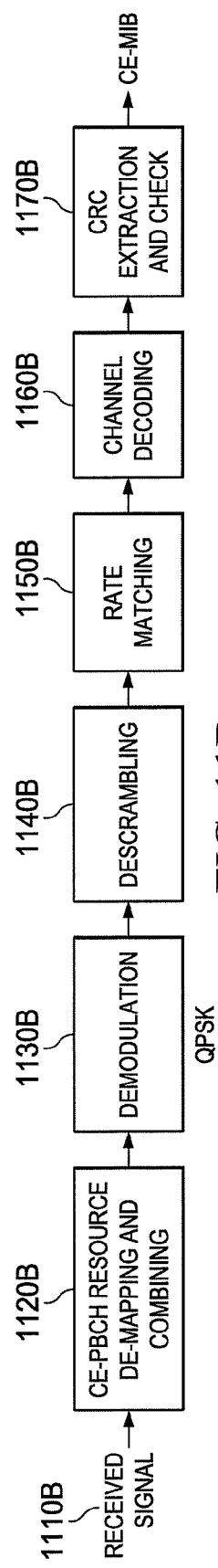
FIG. 11B illustrates a CE-PBCH receiver according to this disclosure.

FIG. 11B illustrates a CE-PBCH receiver according to this disclosure. The embodiment of the CE-PBCH receiver shown in FIG. 11B is for illustration only. Other embodiments could be used without departing from the scope of the present disclosure.

Referring to FIG. 11B, the UE 114 receives a signal 1110A transmitted by eNB 102, in CE-PBCH resource de-mapping and combining block 1120A, a de-mapper performs de-mapping of resources (REs) that eNB 102 used to transmit CE-PBCH and a combiner combines repetitions of a CE-PBCH transmission, a demodulator 1130B demodulates CE-PBCH symbols, a descrambler 1140B descrambles the demodulated CE-PBCH symbols followed by a rate matching unit 1150B and by a channel decoder 1160B and a CRC extraction and check unit 1170B. If the CRC check is positive, UE 114 considers that it detected the CE-MIB; otherwise, UE 114 attempts a new CE-PBCH decoding of assumed receptions of CE-PBCH repetitions. The new CE-PBCH decoding can correspond to a different hypothesis for the scrambling code conveying the LSBs of the SFN or can correspond to combined CE-PBCH receptions in multiple successive frames. A CE-PBCH receiver is same as a PBCH receiver but as a PBCH transmission is not repeated and always occurs at a predetermined SF (SF#0), there is no combiner and UE 114 can always assume that a PBCH reception exists.

If the MIB conveys different contents than the CE-MIB, UE 114 operating in CE mode can still attempt to detect the MIB if its contents are a superset of the contents of the CE-MIB. In this manner, when a CE-PBCH transmission is intermittent, UE 114 can shorten a time required to establish a communication link with eNB 102.

UE 114 operating in CE mode can perform two decoding operations in each frame to detect a MIB or a CE-MIB; one decoding operation for PBCH reception and one decoding operation for reception of CE-PBCH repetitions (combined with a PBCH reception if the MIB and the CE-MIB have same contents, including a same CRC). If the MIB has a first content and the CE-MIB has a second content different that the first content and the first or second content is not a superset of the second or first content, respectively, the UE 114 can perform one decoding operation for receptions of CE-PBCH repetitions in each frame to acquire the CE-MIB. If the content of the MIB is a superset of the content of the CE-MIB, UE 114 can perform two decoding operations in each frame to detect a MIB or a CE-MIB; one decoding operation for PBCH reception and one decoding operation for reception of CE-PBCH repetitions.

In a TDD system, if all TDD UL-DL configurations (as in Table 1) are supported for CE, only SF#0 and SF#5 can be used in practice for CE-PBCH repetitions, considering that a smallest DwPTS length in special SF is 3 symbols (as in Table 2). If TDD UL-DL configuration 0 is not supported for CE-PBCH transmissions, SF#9 can be ensured to be a DL SF and can also be used to transmit CE-PBCH. Further, if the special SF configuration having a DwPTS length of 3 symbols or 6 symbols is not supported for CE-PBCH transmissions, SF#1 and SF#6 can also be used to transmit CE-PBCH.

To maximize resources available for transmission of CE-PBCH repetitions, support for CE-PBCH can be restricted to TDD UL-DL configurations 1-6 and to special SF configurations with a DwPTS length of at least 9 symbols. As UE 114 operating in CE mode cannot know a TDD UL-DL configuration prior to receiving a SIB, the UE 114 can assume that SF#6 is a special SF for the purpose of detecting CE-PBCH. Moreover, as UE 114 cannot know a DwPTS length prior to receiving a SIB, the UE 114 can assume that the DwPTS length in a special SF is 9 symbols for the purpose of detecting CE-PBCH. If SF#6 is a DL SF, symbols after the first 9 symbols are not used to transmit CE-PBCH. If only a special SF configuration having a DwPTS length of 3 symbols is not supported for CE-PBCH, a DwPTS can include at least 6 symbols and UE 114 can assume that a DwPTS length in a special SF is the minimum one of 6 symbols. In general, if special SF configurations with respective DwPTS lengths smaller than $N_{DwPTS}$ symbols are not supported for CE-PBCH, where $N_{DwPTS}$ is a DwPTS length of a valid special SF configuration then, for the purpose of CE-PBCH decoding, UE 114 can assume that a DwPTS length in a special SF is $N_{DwPTS}$ symbols. The same applies for transmissions of a PDSCH conveying a SIB for UEs operating in CE mode.

FIG. 12 illustrates example options for time domain resources used to transmit CE-PBCH in a TDD system according to this disclosure. The embodiment of the options shown in FIG. 12 is for illustration only. Other embodiments could be used without departing from the scope of the present disclosure.

Referring to FIG. 12, in a first option (Option 1) a transmission of a CE-PBCH segment is repeated in SF#0 and SF#5 of a frame wherein a repetition can include a conventional PBCH transmission (if the MIB and the CE-MIB have same contents, including a same CRC). Resources used by eNB 102 to map repetitions of a CE-PBCH transmission exclude the first three symbols in each respective unicast SF because UE 114 operating in CE mode is typically not capable of detecting information transmitted by eNB 102 and indicating a number of first SF symbols used by eNB 102 to transmit DL control signaling. If a DL operating bandwidth is small enough for a maximum DL control region size in the beginning of a SF to be four symbols (see also REF 1), instead of three symbols then, as the UE 114 is not aware of the DL operating BW prior to decoding the MIB, the UE 114 can always assume that a CE-PBCH transmission always begins after the first three symbols in a SF. For a small DL operating bandwidth, it can be up to eNB 102 scheduler to avoid collisions between CE-PBCH transmission and transmission of other DL control signaling.

In a second option (Option 2), TDD UL-DL configuration 0 is not supported for CE-PBCH repetitions. Then, 11 additional symbols in SF#9 can be used to transmit CE-PBCH. The same applies for transmissions of a PDSCH conveying a SIB for UEs operating in CE mode.

In a third option (Option 3), SF#1 and SF#6 are additionally used got eNB 102 to transmit CE-PBCH repetitions and UE 114 assumes that SF#6 is a special SF and that a CE-PBCH is transmitted in the six symbols after the first three symbols in a unicast SF (that is, UE 114 assumes a DwPTS length of 9 symbols where DwPTS length of 3 or 6 symbols is not supported). Then, 12 additional symbols in SF#1 and SF#6 can be used by eNB 102 to transmit CE-PBCH. If only a DwPTS length of 3 symbols is not supported, then 6 additional symbols in SF#1 and SF#6 can be used. The same applies for transmissions of a PDSCH conveying a SIB for UEs operating in CE mode.

For either TDD or FDD, eNB 102 can use a single predetermined configuration of resources used to transmit CE-PBCH (for example, one of the options in FIG. 12). UE 114 knows the configuration before UE 114 acquires a CE-MIB so that UE 114 can combine repetitions of a CE-PBCH on the predefined resources to decode the CE-MIB. The same applies for transmissions of a PDSCH conveying a SIB for UEs operating in CE mode.

Alternatively, resources used by eNB 102 to transmit CE-PBCH can be determined from one configuration from a set of multiple configurations wherein each configuration uses a different number of CE-PBCH repetitions than another configuration (for example, the configurations as in FIG. 12 with three different numbers of CE-PBCH repetitions). Depending on a CE requirement in a cell, eNB 102 can select a respective configuration. Selecting a configuration for CE-PBCH repetitions according to a respective CE requirement can result to a lower overhead associated with CE-PBCH transmissions as unnecessary repetitions can be avoided. For example, if a lower CE level is needed in a first cell, eNB 102 can use a configuration with a lower number of CE-PBCH repetitions (for example, Option 1 as in FIG. 12) while if a larger CE level is needed in a second cell, eNB 102 can use a configuration with a higher number of CE-PBCH repetitions (for example, Option 3 as in FIG. 7). Then, as UE 114 cannot know in advance the configuration eNB 102 uses to transmit CE-PBCH, UE 114 blindly decodes CE-PBCHs for each configuration from the set of multiple configurations until it detects the CE-MIB. The same applies for transmissions of a PDSCH conveying a SIB for UEs operating in CE mode.

In certain embodiments, a common design is provided for CE-PBCH repetitions in FDD and in TDD.

To establish a same design for repetitions of a CE-PBCH in FDD and in TDD, resources for CE-PBCH can consider limitations in available resources for both TDD and FDD, such as the resources used to transmit PSS/SSS, TDD UL-DL configurations, and so on. A common design for CE-PBCH repetitions in TDD and in FDD can result to same implementation at a UE thereby minimizing cost and testing requirements.

Figure 13A:
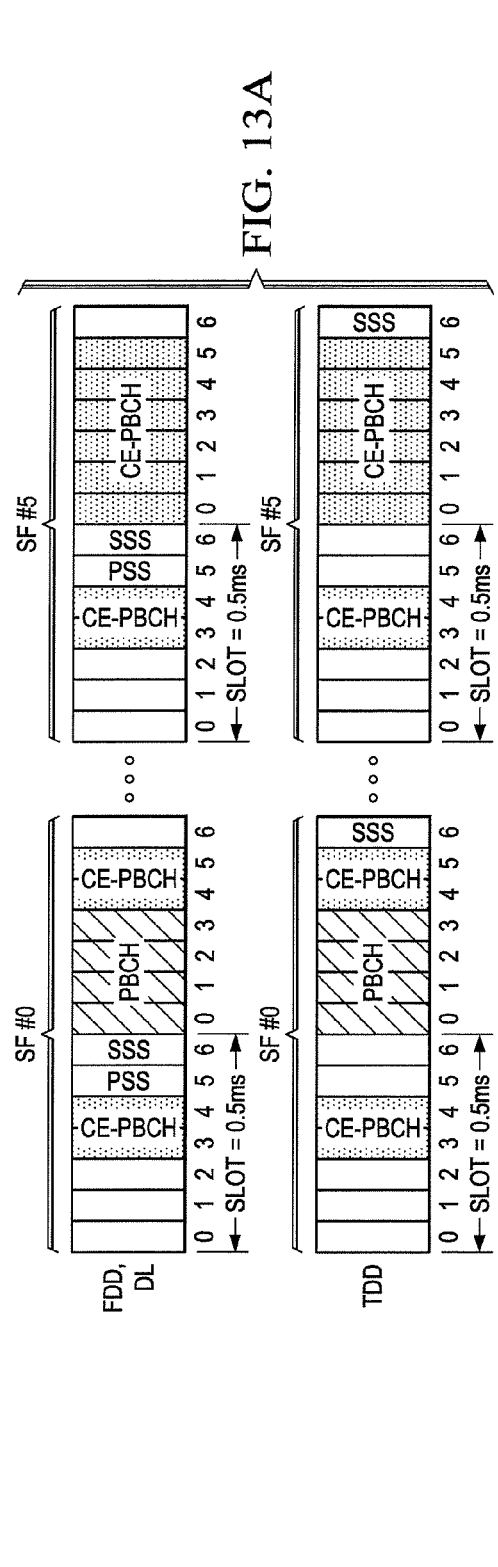
FIGS. 13A, 13B, and 13C respectively illustrate a first option, a second option, and a third option for time domain resources for CE-PBCH repetitions that are common for Time Division Duplex (TDD) and Frequency Division Duplex (FDD) according to this disclosure.
Figure 13B:
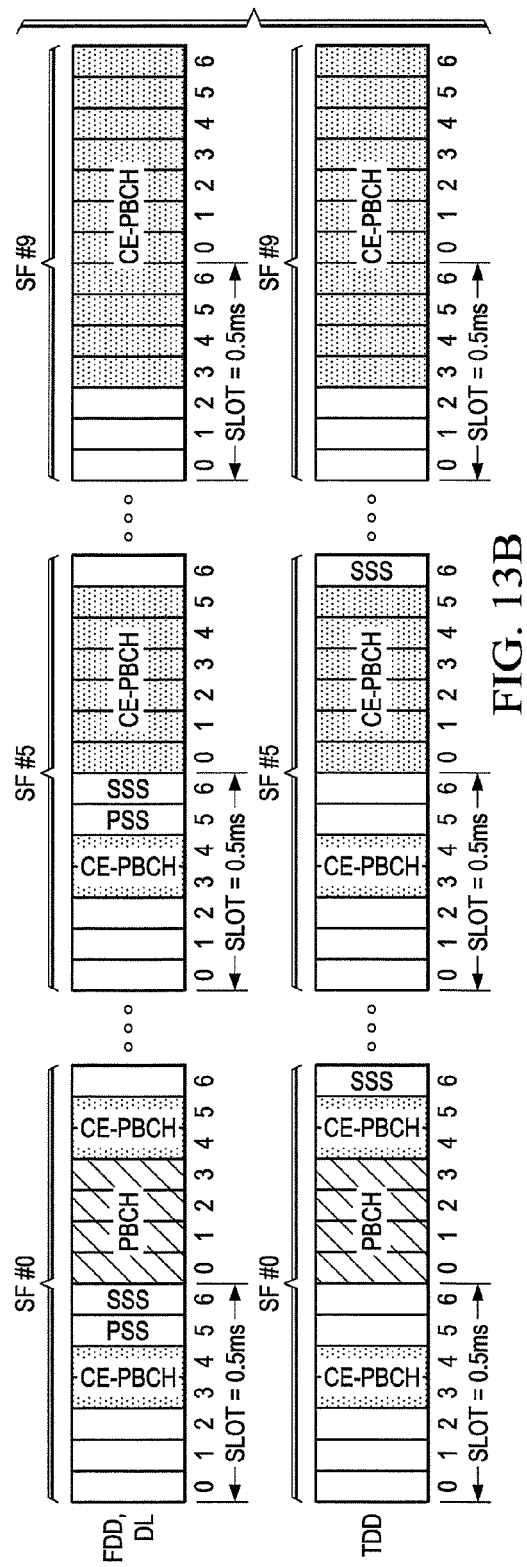
Figure 13C:
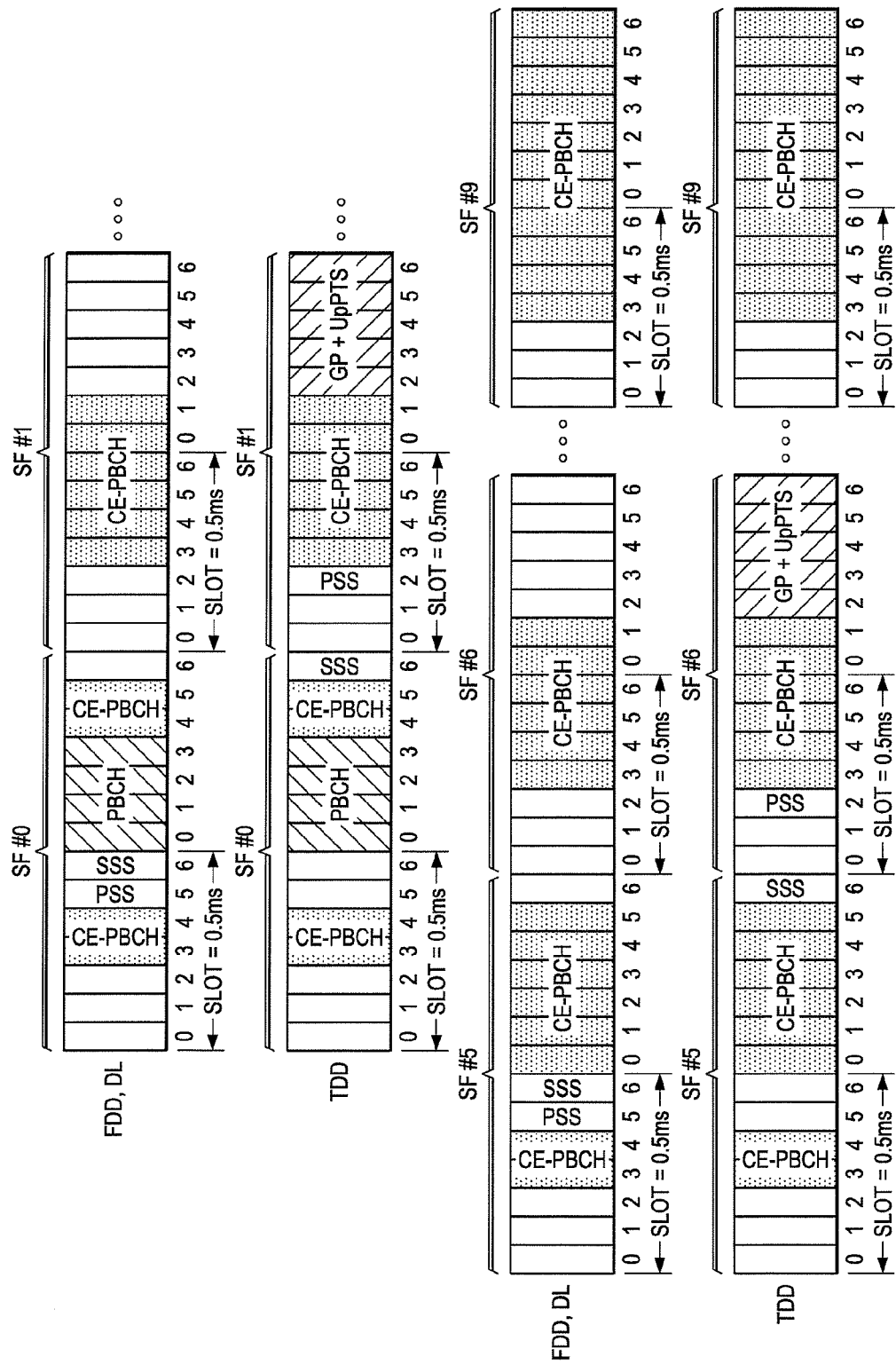

FIGS. 13A, 13B, and 13C respectively illustrate a first option, a second option, and a third option for time domain resources for CE-PBCH repetitions that are common for TDD and FDD according to this disclosure. The embodiments shown in FIGS. 13A, 13B and 13C are for illustration only. Other embodiments could be used without departing from the scope of the present disclosure.

Referring to FIG. 13A, in a first option (Option 1), only SF#0 and SF#5 are used by eNB 102 to transmit CE-PBCH repetitions in both a FDD system and a TDD system. Excluding SF symbols used to transmit PSS/SSS in FDD, a total of 16 SF symbols can be used to transmit CE-PBCH. If the information contents of the MIB and the CE-MIB are same, including a same CRC, UE 114 can consider a conventional PBCH segment as one of the repetitions.

Referring to FIG. 13B, in a second option (Option 2), TDD UL-DL configuration 0 is not supported for CE-PBCH transmission and eNB 102 can use 11 additional symbols in SF#9 to transmit CE-PBCH.

Referring to FIG. 13C, in a third option (Option 3), eNB 102 can also transmit CE-PBCH in special SFs in TDD where a DwPTS length is assumed to be 9 symbols. Then, by excluding the first three SF symbols, eNB 102 can use 12 additional symbols in SF#1 and SF#6 to transmit CE-PBCH.

Option 3 combines both limitations on TDD UL-DL configuration and DwPTS. If only the limitation on DwPTS applies, without a limitation of excluding TDD UL-DL configuration 0 for support of CE-PBCH repetitions, it is yet another option that only SF#0, SF#1, SF#5, and SF#6 can be used by eNB 102 to transmit CE-PBCH.

In certain embodiments, resources for CE-PBCH repetitions can be predefined through a function that maps system information, such as SFN and PCID, to parameters related to resources used for CE-PBCH repetitions.

For CE-PBCH repetitions within 4 frames, parameters related to resources used for CE-PBCH repetitions include a starting frame with SFN (where SFN is the full SFN of 10 bits) satisfying (MSB8_SFN)mod N=m, where MSB8_SFN is the 8-bit MSB of the SFN, N is a predefined number (N<256) determining a periodicity of CE-PBCH repetitions and m is a predefined number with m<N acting as an offset to a starting frame for CE-PBCH repetitions.

Figure 14:
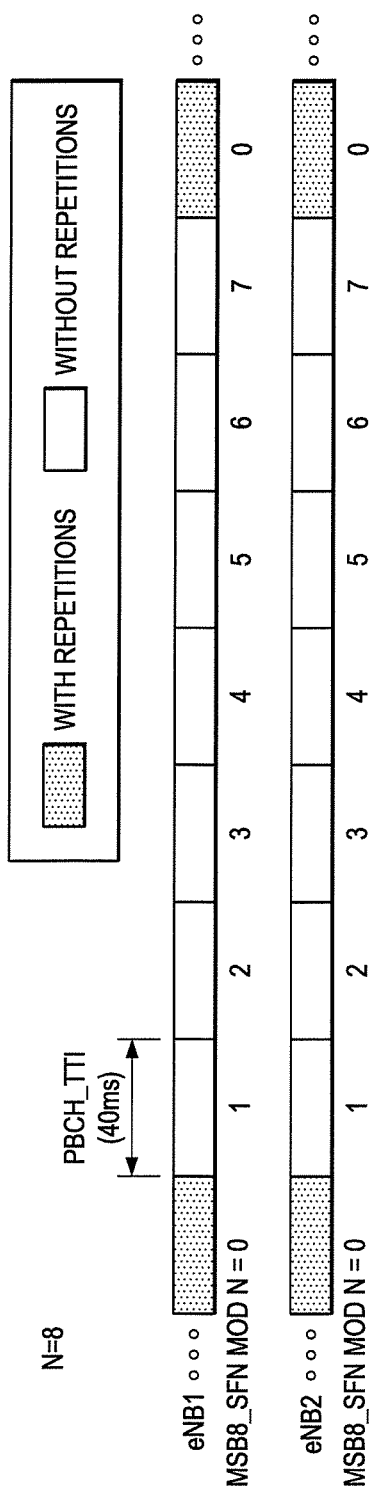
FIG. 14 illustrates an example for determining resources for transmission of CE-PBCH repetitions based on a mapping function according to this disclosure.

FIG. 14 illustrates an example for determining resources for transmission of CE-PBCH repetitions based on a mapping function according to this disclosure. The embodiment for determining resources for transmission of CE-PBCH repetitions shown in FIG. 14 is for illustration only. Other embodiments could be used without departing from the scope of the present disclosure.

Referring to FIG. 14, both eNB 101 and eNB 102 use N=8 and m=0. CE-PBCH repetitions are in 4 frames and start from a frame with SFN satisfying (MSB8_SFN)mod N=0. Different eNBs can have a different offset value m.

Figure 15:
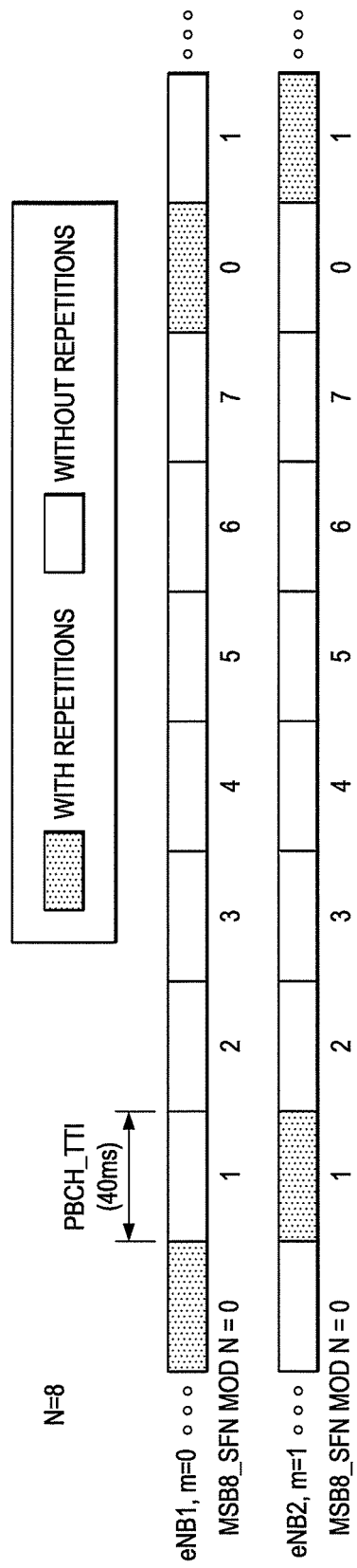
FIG. 15 illustrates two eNBs transmitting CE-PBCH repetitions using a different starting frame according to this disclosure.

FIG. 15 illustrates two eNBs transmitting CE-PBCH repetitions using a different starting frame according to this disclosure. The embodiment of the CE-PBCH repetitions shown in FIG. 15 is for illustration only. Other embodiments could be used without departing from the scope of the present disclosure.

Referring to FIG. 15, both eNB 102 and eNB 103 use N=8. eNB 102 uses m=0 while eNB 103 uses m=1. CE-PBCH repetitions are in 4 frames and start from a frame with SFN satisfying (MSB8_SFN)mod N=m.

The offset value m can depend on a PCID value of an eNB. Then, CE-PBCH repetitions are in 4 frames and start from a frame with SFN satisfying (MSB8_SFN)mod N=PCID mod K, where K is a parameter that can be predefined in a system operation.

FIG. 16 illustrates repetitions of a CE-PBCH starting from a frame determined from a PCID value according to this disclosure. The embodiment of the CE-PBCH shown in FIG. 16 is for illustration only. Other embodiments could be used without departing from the scope of the present disclosure.

Referring to FIG. 16, both eNB 101 and eNB 102 use N=8 and K=2. The eNB 101 has PCID mod K=0 while the eNB 102 has PCID mod K=1. The CE-PBCH repetitions are in 4 frames and start from a frame with SFN satisfying (MSB8_SFN)mod N=PCID mod K However, different eNBs can also have different periodicity of value N.

FIG. 17 illustrates repetitions of a CE-PBCH from two eNBs using a different periodicity for CE-PBCH repetitions according to this disclosure. The embodiment of the repetitions of a CE-PBCH shown in FIG. 17 is for illustration only. Other embodiments could be used without departing from the scope of the present disclosure.

Referring to FIG. 17, both eNB 101 and eNB 102 use m=0. The eNB 101 uses N=8 while the eNB 102 uses N=4. The CE-PBCH repetitions are in 4 frames and start from a frame with SFN satisfying (MSB8_SFN)mod N=m.

A periodicity of CE-PBCH repetitions can depend on a PCID value of the eNB. Then, a CE-PBCH is transmitted in 4 frames starting from a frame with SFN satisfying (MSB8_SFN)mod N=m, where $N=Z/2^{PCID\ mod\ K}$ and K and Z are parameters that can be predefined in a system operation.

Figure 18:
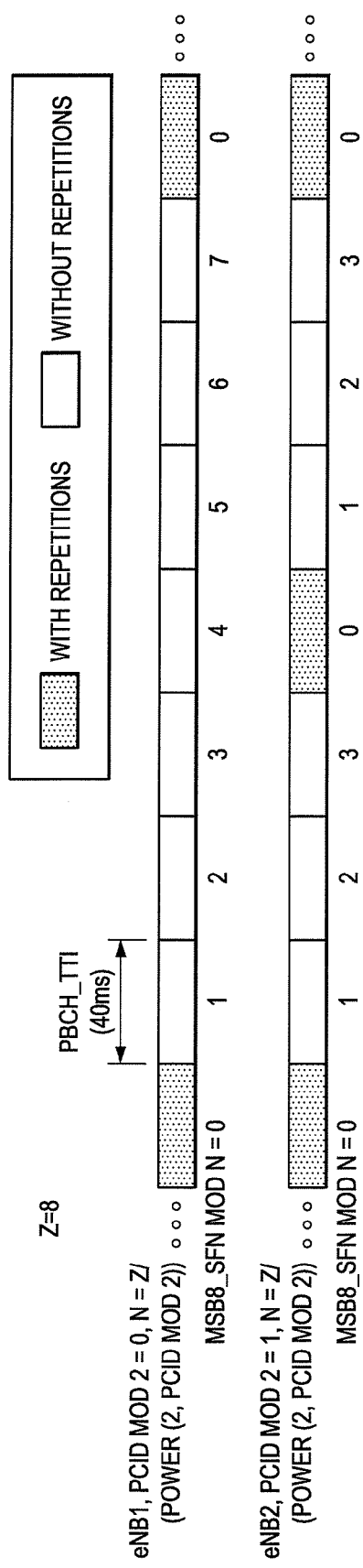
FIG. 18 illustrates CE-PBCH repetitions from two eNBs using a different periodicity according to this disclosure.

FIG. 18 illustrates CE-PBCH repetitions from two eNBs using a different periodicity according to this disclosure. The embodiment of the CE-PBCH repetitions shown in FIG. 18 is for illustration only. Other embodiments could be used without departing from the scope of the present disclosure.

Referring to FIG. 18, both eNB 101 and eNB 102 use m=0, Z=8, and K=2. The eNB 101 uses $N=Z/2^{PCID\ mod\ K}=8$ while the eNB 102 uses $N=Z/2^{PCID\ mod\ K}=4$. The CE-PBCH repetitions are in 4 frames and start from a frame with SFN satisfying (MSB8_SFN)mod N=m, where $N=Z/2^{PCID\ mod\ K}$.

Parameters related to resources eNB 102 uses for transmission of CE-PBCH repetitions can include a duration for repetitions, such as for example a number of consecutive quadruples of frames, referred to as Q. In the examples in FIGS. 14-18, Q=1. Different eNBs can use a different value of Q.

Figure 19:
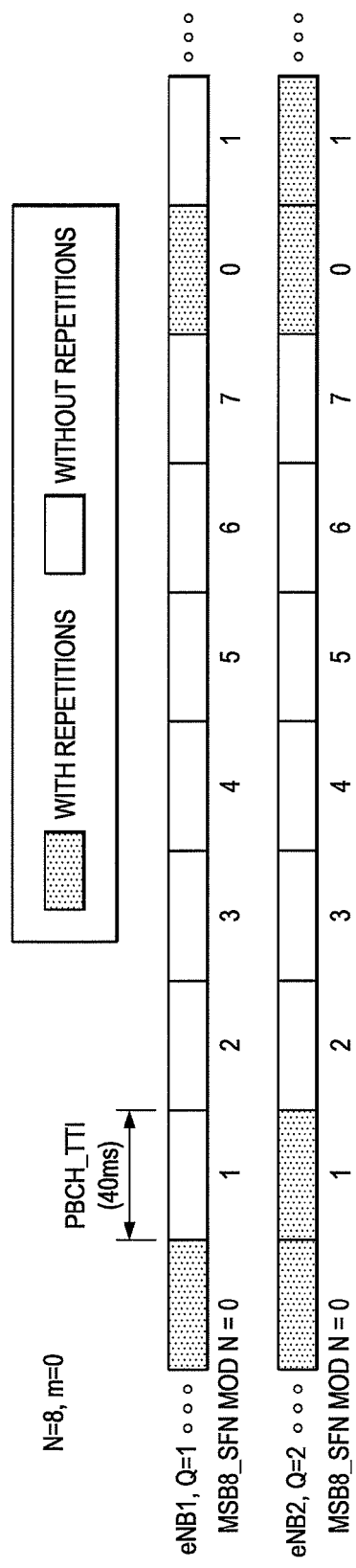
FIG. 19 illustrates CE-PBCH repetitions from two eNBs using different respective durations for CE-PBCH repetitions according to this disclosure.

FIG. 19 illustrates CE-PBCH repetitions from two eNBs using different respective durations for CE-PBCH repetitions according to this disclosure. The embodiment of the CE-PBCH repetitions shown in FIG. 18 is for illustration only. Other embodiments could be used without departing from the scope of the present disclosure.

Referring to FIG. 19, both eNB 101 and eNB 102 have N=8 and m=0. The eNB 101 has Q=1 while the eNB 102 has Q=2. The CE-PBCH repetitions are in 4 frames, start from a frame with SFN satisfying (MSB8_SFN)mod N=m and are in consecutive Q intervals of 4 frames.

For CE-PBCH repetitions in 4 frames, referred to as PBCH_TTI, parameters related to resources for CE-PBCH repetitions can also include a number of repetitions (referred to as level) within 4 frames. For example, level=00 can correspond to resource set 0 within a 40 msec PBCH_TTI (for example, Option 1 in FIGS. 12 and 13), level=01 can correspond to resource set 1 within a 40 msec PBCH_TTI (for example, Option 2 in FIGS. 12 and 13), and level=10 can correspond to resource set 2 within a 40 msec PBCH_TTI (for example, Option 3 in FIGS. 12 and 13).

There can be L levels or, equivalently, L numbers of CE-PBCH repetitions in a frame. If there is only one level, the CE-PBCH can be predefined in a system operation. If there are multiple levels, the UE 114 operating in CE can determine a level used by eNB 102 to transmit CE-PBCH by blind decoding.

When there are multiple repetition patterns that can be used by eNB 102 to transmit CE-PBCH repetitions, where a repetition is either in a time scale of PBCH_TTI (40 msec) or in a time scale of SFs within a PBCH_TTI, UE 114 needs to perform blind decoding with hypothesis testing to determine the pattern used by eNB 102 to transmit CE-PBCH.

Figure 20:
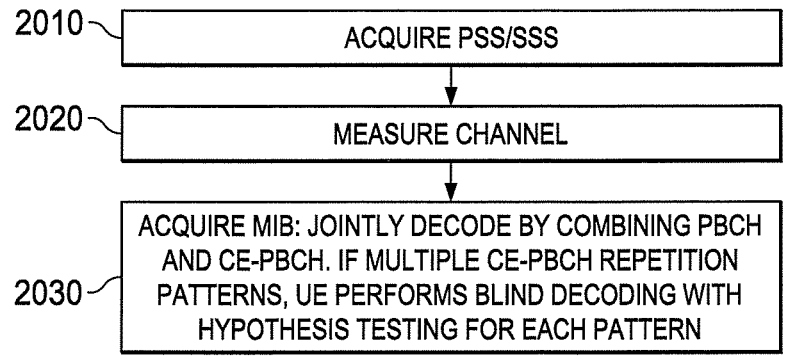
FIG. 20 illustrates an example operation for blind decoding with hypothesis testing for multiple CE-PBCH repetition patterns according to this disclosure.

FIG. 20 illustrates an example operation for blind decoding with hypothesis testing for multiple CE-PBCH repetition patterns according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a mobile station.

Referring to FIG. 20, in operation 2010 the UE 115 acquires the PSS/SSS. In operation 2020, after acquiring the PSS/SSS, the UE 114 measures a DL channel medium based on a reference signal. In operation 2030, the UE 114 operating in CE mode can detect a MIB by combining PBCH and CE-PBCH if both convey a same MIB (or by combining CE-PBCH repetitions if they convey a different MIB, CE-MIB, that a PBCH). If there are multiple repetition patterns configured for CE-PBCH, UE 114 performs blind decoding with hypothesis testing for these repetition patterns.

Selecting one of multiple patterns of quadruples of frames for CE-PBCH transmissions can allow eNB 102 to adjust a level of respective overhead to a CE level needed for a respective cell. Although a UE performing an initial access to eNB 102 cannot know the actual pattern that the eNB 102 uses for CE-PBCH transmissions, the eNB 102 can inform connected UEs (RRC_CONNECTED UEs—see also REF 5) of the actual pattern either by including respective information in a SIB or by RRC signaling. In case a CE-PBCH transmission pattern is as described in one of FIGS. 14-19, the eNB 102 can signal the respective parameters to a connected UE. In general, for a CE-PBCH transmission pattern over a number of quadruples of frames, a bit-map can be signaled to the UE. The bit-map size can be determined by the number of quadruples of frames. A bit-map element with value of '0' or '1' can indicate that CE-PBCH is not transmitted or is transmitted, respectively, in the corresponding quadruple of frames. Using this information, a UE, such as UE 116 connected to eNB 102 and configured to receive PDSCH or EPDCCH in RBs that include the central 6 RBs of a DL operating bandwidth in a SF where eNB 102 indicates that it can transmit CE-PBCH repetitions, can determine whether to include (bit-map value for respective frame is '0') or discard (bit-map value for respective frame is '1') for PDSCH or EPDCCH reception the RBs that are in the central 6 RBs.

In certain embodiments, CE for a SIB is provided and referred to as CE-SIB.

Similar to other embodiments (such as embodiments for designs for supporting scalable CE levels for a PBCH and embodiments for a common design for CE-PBCH repetitions in FDD and in TDD), resources for CE-SIB repetitions can be in SFs determined by applying a same rule as for CE-PBCH repetitions in the time domain.

Similar to embodiments in which resources for intermittent transmissions of CE-PBCH repetitions are predefined through a function that maps system information, such as SFN and PCID, to parameters related to resources used for CE-PBCH repetitions, a CE-SIB resource location (SFs or RBs) can be a function of system information. Since UE 114 operating in the CE mode already knows a DL operating bandwidth after detecting the MIB or the CE-MIB, a transmission of CE-SIB may not be included in the central 6 RBs of the DL operating bandwidth. A predefined mapping function can be used to derive a CE-SIB resource location in a SF and can include the DL operating bandwidth as one of its parameters.

For example, a starting SF for a transmission of CE-SIB repetitions can at the beginning of a PBCH_TTI that is immediately after a PBCH_TTI that contains CE-PBCH repetitions, or determined by a function of parameters such as SFN and POD. For configuration of a duration for a CE-SIB transmission (referred to as Duration_CESIB_ConfigIndex), assuming one configuration of duration for each respective DL operating bandwidth configuration (referred to as BW_ConfigIndex), a one-to-one mapping can be used (or equivalently a mapping table can be used), Duration_CESIB_ConfigIndex=BW_ConfigIndex. For configuration of frequency domain resources (RBs) for a transmission of CE-SIB repetitions (referred to as Band_CESIB_ConfigIndex), assuming one configuration of the frequency band for each respective DL operating bandwidth configuration (referred to as BW_ConfigIndex), a one-to-one mapping can be used, (or equivalently a mapping table can be used), and Band_CESIB_ConfigIndex=BW_ConfigIndex.

Figure 21A:
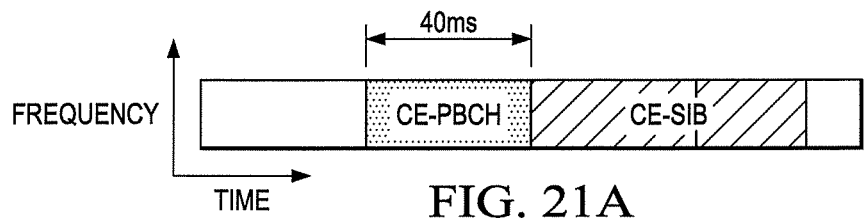
FIGS. 21A, 21B and 21C illustrate examples for mapping of resources for a CE-System Information Block (CE-SIB) transmission according to this disclosure.
Figure 21B:
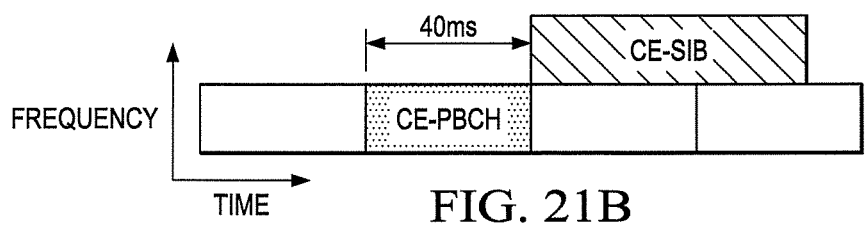
Figure 21C:
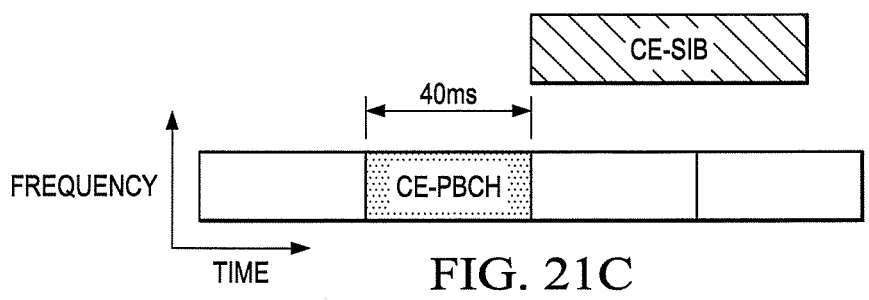

FIGS. 21A, 21B and 21C illustrate examples for mapping of resources for a CE-SIB transmission according to this disclosure. The embodiments of the mappings shown in FIGS. 21A, 21B and 21C are for illustration only. Other embodiments could be used without departing from the scope of the present disclosure.

In the example shown in FIG. 21A, BW_ConfigIndex=1 and Band_CESIB_ConfigIndex=1. In the example shown in FIG. 21B, BW_ConfigIndex=2 and Band_CESIB_ConfigIndex=2. In the example shown in FIG. 21C BW_ConfigIndex=3 and Band_CESIB_ConfigIndex=3.

An advantage of defining resources (SFs and RBs) for transmission of CE-SIB repetitions as a function of parameters such as a PCID or a SFN, and not as a function of SFs for transmission of CE-PBCH repetitions, is that UE 114 operating in CE mode can detect the MIB conveyed by the PBCH and then proceed to decode a CE-SIB without having to detect the CE-MIB conveyed by the CE-PBCH that can have a large transmission periodicity. This assumes that the contents of the first MIB are a superset of the contents of the second MIB.

In certain embodiments, the UE 114 determines that it is coverage limited if UE 114 does not detect a conventional PBCH after a predefined number of MAX_MIB_Attempt decoding attempts. Also, if UE 114 detects a conventional PBCH with a number of attempts no greater than MAX_MIB_Attempt but fails to subsequently detect a SIB according to a procedure that is subsequently described, UE 114 determines that it is coverage limited.

A decoding attempt can be defined either over a time interval of PBCH_TTI (4 frames) or over a frame and correspond to a PBCH segment.

After UE 114 acquires PSS and SSS, UE 114 can start a counter to count a number of decoding attempts for detection of the PBCH. For example, the counter can be initialized to zero and increase by 1 for each decoding attempt. If UE 114 detects the PBCH with a number of decoding attempts no greater than a predefined number MAX_MIB_Attempt, UE 114 continues its network access using a conventional procedure. If after MAX_MIB_Attempt decoding attempts for the PBCH the UE 114 cannot detect the PBCH, UE 114 determines that it is coverage limited and continues its network access using a procedure supporting CE. Alternatively, UE 114 determines that transmission of both the PBCH and the CE-PBCH and perform two separate decoding operations possibly combining a PBCH reception with receptions of assumed CE-PBCH repetitions in case the MIB has the same contents as the CE-MIB (including a same CRC). Subsequently, if UE 114 detects CE-PBCH, UE 114 determines that it is coverage limited. A determination (or assumption) for coverage limited operation can be further conditioned on a RS Received Power (RSRP) measurement. The UE 114 can determine that it is coverage limited only if UE 114 measures a RSRP that is below a value that is predefined in the system operation. The RSRP measurement can be based on an assumption of a single antenna port at eNB 102 and can be performed by UE 114 in the central 6 RBs of a DL operating bandwidth and in SFs that UE 114 knows in advance to include RS transmission, such as SF#0 and SF#5. As another alternative, UE 114 can be manually configured to operate in a CE mode or at a CE level at the time of its deployment.

If UE 114 detects the PBCH after a number of decoding attempts that is not greater than MAX_MIB_Attempt, UE 114 proceeds to detect SIBs (for example, SIB1 or SIB2). If UE 114 detects a SIB successfully using a conventional procedure with a number of decoding attempts no greater than a predefined number MAX_SIB_Attempt, UE 114 can continue to assume to be in a normal (non-CE) coverage mode; otherwise, UE 114 switches operation to a CE mode and attempts to detect a CE-SIB. Prior to detecting a the CE-SIB, UE 114 may attempt to detect CE-MIB if the contents of the CE-MIB are not a subset of the MIB or if a first transmission SF for the CE-SIB is derived based on the frames the eNB 102 transmits the CE-PBCH.

Figure 22:
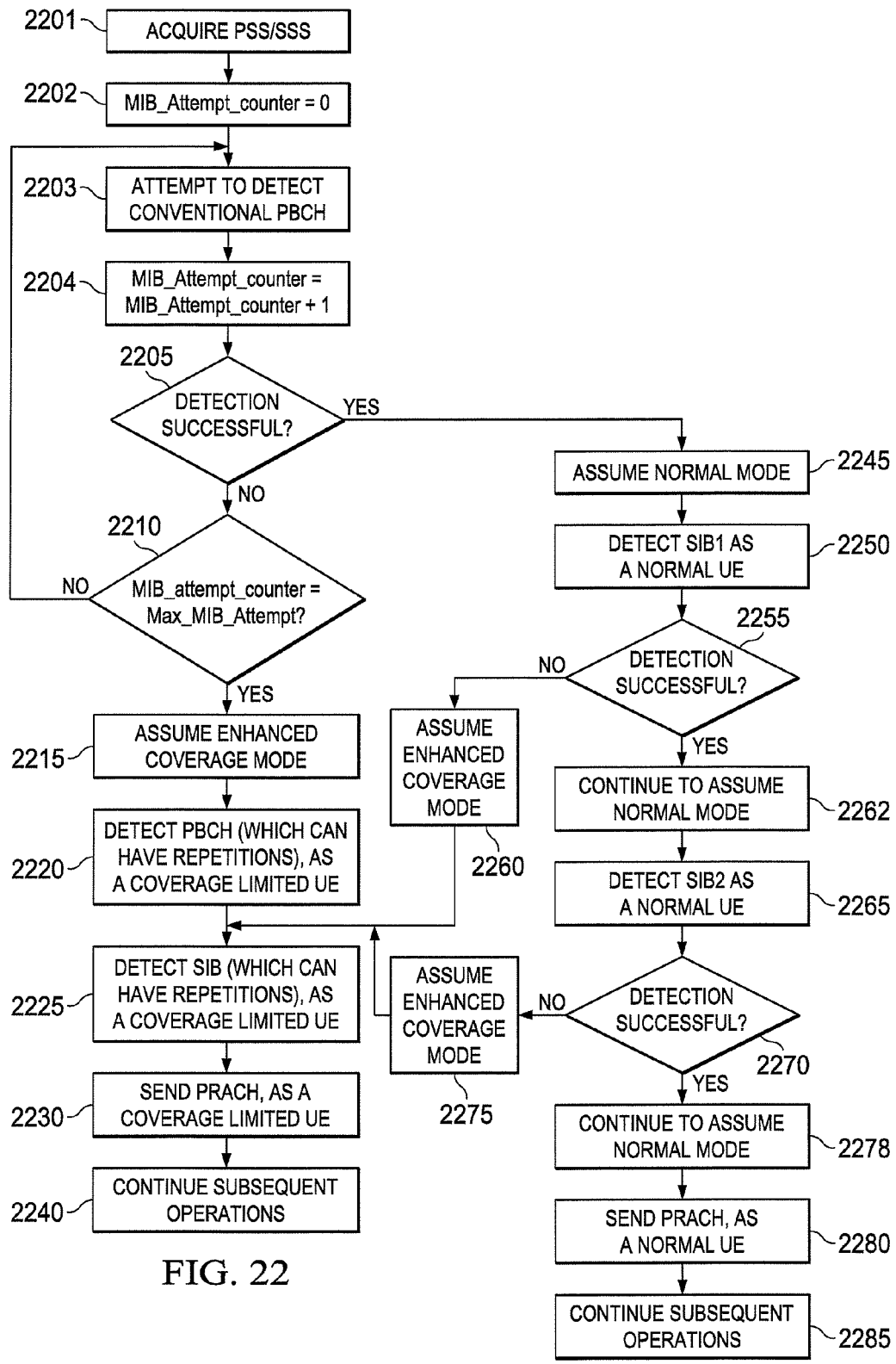
FIG. 22 illustrates example operations for a UE to establish a communication link with an eNB according to this disclosure.

FIG. 22 illustrates example operations for a UE to establish a communication link with an eNB according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a mobile station.

In operation 2201 UE 114 first acquires PSS and SSS. Then, in operation 2202, UE 114 initializes a MIB_Attempt_counter to zero. The UE 114 proceeds to attempt to detect a PBCH in operation 2203. After a detection attempt, UE 114 increases the MIB_Attempt_counter by 1 in operation 2204. Subsequently, UE 114 determines whether the detection attempt is successful in operation 2205. If it is successful, UE 114 assumes a normal (non-CE) coverage mode in operation 2245 and proceeds using a conventional procedure to establish a communication link with eNB 102. If UE 114 fails to detect the PBCH, in operation 2210, UE 114 examines whether MIB_Attempt_counter has a value MAX_MIB_Attempt. If MIB_Attempt_counter is less than MAX_MIB_Attempt, UE 114 performs another decoding of the PBCH in operation 2203. If MIB_Attempt_counter equals MAX_MIB_Attempt, UE 114 starts operating in CE mode in operation 2215 and decodes CE-PBCH in operation 2220 in addition to decoding PBCH. Specific decoding operations for operation 2220 are subsequently described herein below with respect to FIGS. 24 and 25. After detecting PBCH, in operation 2225, UE 114 proceeds to detect a SIB that can be transmitted using repetitions. For operation in CE mode, some of the contents of SIB1 and SIB2, and possibly other SIBs such as SIB15, can be merged in a single SIB (CE-SIB). Contents of conventional SIB1, SIB2, or other SIB that are not needed for CE operation can be omitted from the CE-SIB. Finally, in operation 2230, UE 114 transmits PRACH according to a CE procedure as is described herein below with respect to FIGS. 23 and 26, and UE 114 continues operating in a CE mode in operation 2240.

When UE 114 continues operation in a normal (non-CE) coverage mode after detecting the PBCH in operation 2245, UE 114 proceeds to detect SIB1 as a normal coverage (non-CE) UE in operation 2250. UE 114 then determines, for example by examining a CRC check, whether a decoding is successful in operation 2255. If the decoding fails after a number of MAX_SIB1_Attempt decoding attempts, similar to the PBCH detection, UE 114 continues operation in a CE mode in operation 2260 and proceeds to detect SIB1 or a combined single CE-SIB in operation 2225. In operation 2255, if UE 114 determines that a decoding of SIB1 is successful, UE 114 continues to operate in a normal coverage mode in operation 2262, and proceeds to detect SIB2 in operation 2265. UE 114 then determines whether a SIB2 decoding is successful in operation 2270. If SIB2 decoding fails after a number of MAX_SIB2_Attempt decoding attempts, similar to PBCH detection, UE 114 continues operation in a CE mode in operation 2275 and proceeds to detect SIB2 or a combined single CE-SIB in operation 2230. In operation 2270, if UE 114 determines that a decoding of SIB2 is successful, UE 114 continues to operate in a normal coverage mode in operation 2278, transmits PRACH in operation 2280 and, if the random access process is successful, UE 114 continues operating in a normal coverage mode in operation 2285. Although previous functionalities considered initial access of a UE to an eNB, similar functionalities can apply for subsequent access such as access from an idle mode.

As a path-loss (or RSRP) estimate from UE 114 operating in a CE mode can be inaccurate, UE 114 can use a maximum power to transmit a RA preamble. If UE 114 operates in normal, non-CE, coverage mode, UE 114 uses a power determined based on a path-loss estimate to transmit an initial RA preamble and can use power ramping for subsequent RA preamble transmissions if a previous random access process was not successful.

Figure 23:
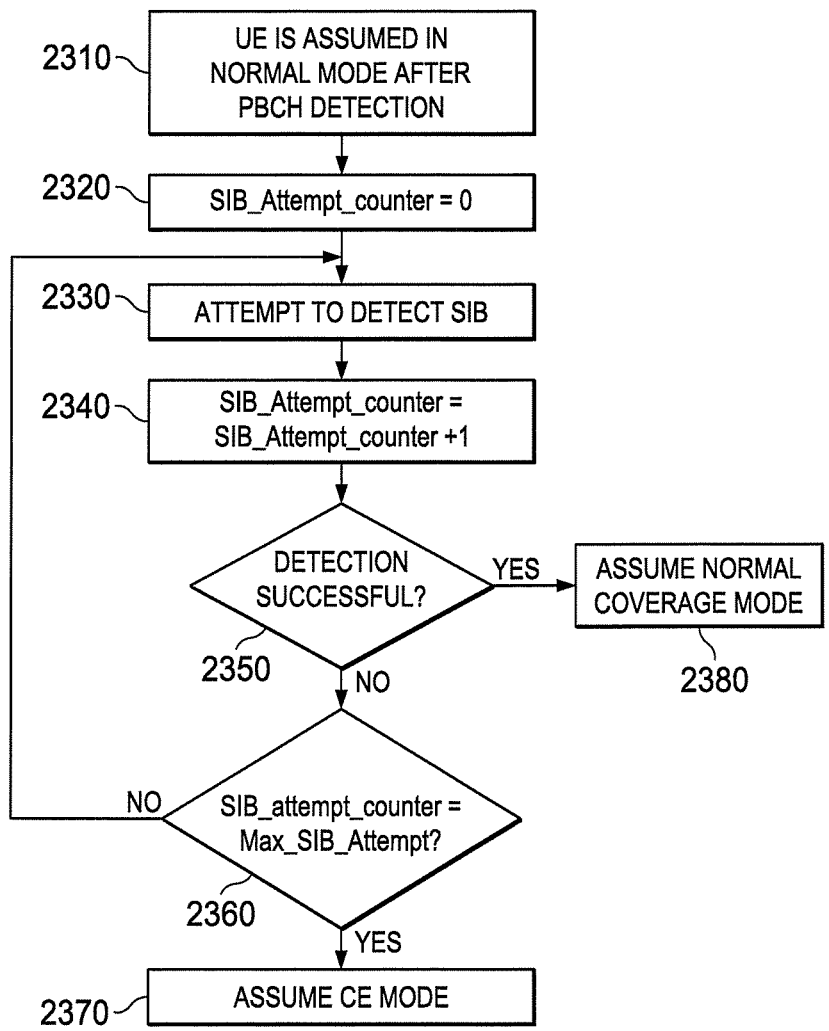
FIG. 23 illustrates an example operation for a UE to determine whether to continue operation in a normal coverage mode or in a CE mode, after PBCH detection in a normal coverage mode, according to this disclosure.

FIG. 23 illustrates an example operation for a UE to determine, after PBCH detection in a normal coverage mode, whether to continue operation in a normal coverage mode or in a CE mode according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a mobile station.

In operation 2310, UE 114 determines that it should operate in normal mode after PBCH detection in a normal coverage mode. Then, in operation 2320, UE 114 initializes a counter SIB_Attempt_counter to value 0 and, in operation 2330, attempts to detect conventional SIBs, such as SIB1 or SIB2, by performing respective decoding operations, and increases SIB_Attempt_counter by 1 in operation 2340. UE 114 determines whether the detection is successful in operation 2350. If successful, UE 114 continues operation in a normal coverage mode in operation 2380. If not successful, in operation 2360, UE 114 checks if SIB_Attempt_counter equals MAX_SIB_Attempt. If SIB_Attempt_counter is less than MAX_SIB_Attempt, UE 114 continues to operate in a normal coverage mode in operation 2330 and repeats operations 2340, 2350, 2360. If SIB_Attempt_counter equals MAX_SIB_Attempt, UE 114 continues operation in a CE mode in operation 2370.

When UE 114 operates in a CE mode, UE 114 can detect CE-SIBs or a single combined CE-SIB that are transmitted with repetitions and can include reduced information content than respective conventional SIBs. When UE 114 operates in a normal coverage mode, UE 114 decodes conventional SIBs. Alternatively, UE 114 can decode CE-SIBs or a single combined CE-SIB where one decoding attempt for a SIB can be considered as a decoding attempt for each repetition of a respective CE-SIB.

UE 114 operating in CE mode can perform two decoding operations in each frame to acquire a MIB or a CE-MIB; one decoding operation for a PBCH reception and one decoding operation for reception of combined CE-PBCH repetitions that can include a PBCH reception if the MIB and the CE-MIB have same contents (including a same CRC). Decoding a PBCH in a frame can benefit UE 114 in case of intermittent transmissions of CE-PBCH and in case the contents of the MIB are a superset of the contents of the CE-MIB, by enabling a faster detection of the MIB. A UE operating in CE mode also benefits from decoding CE-PBCH receptions as a respective detection probability is higher than the one for a PBCH reception in a frame where CE-PBCH repetitions are transmitted.

Figure 24:
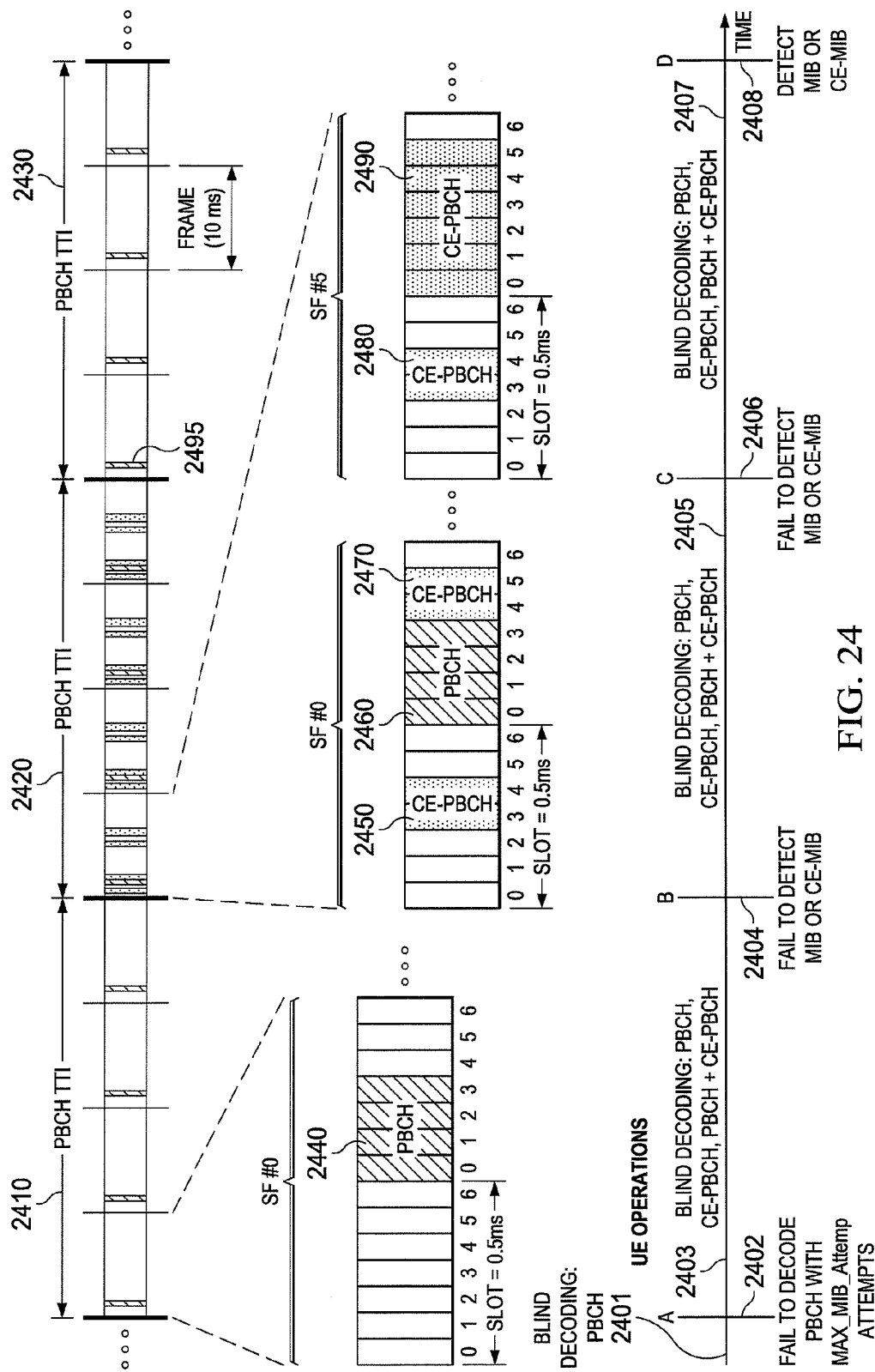
FIG. 24 illustrates example operations for a UE to detect a PBCH according to this disclosure.

FIG. 24 illustrates example operations for a UE to detect a PBCH according to this disclosure. The embodiment of the operations shown in FIG. 24 is for illustration only. Other embodiments could be used without departing from the scope of the present disclosure.

Referring to FIG. 24, in a PBCH_TTI that includes four frames 2410, eNB 102 transmits PBCH 2440 in SF#0 of each frame. In PBCH_TTI 2420, eNB transmits PBCH 2460 in SF#0 of each frame and CE-PBCH in SF#0 and SF#5 2450, 2470, 2480, and 2490 of each frame. In PBCH_TTI 2430, eNB 102 transmits PBCH 2495 in SF#0 of each frame.

Before time A, UE 114 decodes PBCH 2401. At time A, UE 114 determines that it fails to detect a MIB after MAX_MIB_Attempt attempts 2402. Then, UE 114 continues operation in a CE mode. In a subsequent PBCH_TTI, UE 114 decodes PBCH receptions and, if the MIB has same content as the CE-MIB, decodes combined receptions of PBCH and CE-PBCH; otherwise, UE 114 decodes receptions of CE-PBCH repetitions. At time B, UE 114 determines that it fails to detect a MIB or a CE-MIB 2404. In a subsequent PBCH_TTI, UE 114 performs decoding operations 2405 that can be same as in 2403. At time C, UE 114 determines that it fails to detect MIB or CE-MIB 2406. In a subsequent PBCH_TTI, UE 114 performs decoding operations 2407. At time D, UE 114 determines that it detects MIB or CE-MIB 2408 from either decoding PBCH or combined PBCH and CE-PBCH or from decoding CE-PBCH. Note that A, B, C, D can be after any frame in a PBCH_TTI.

Figure 25:
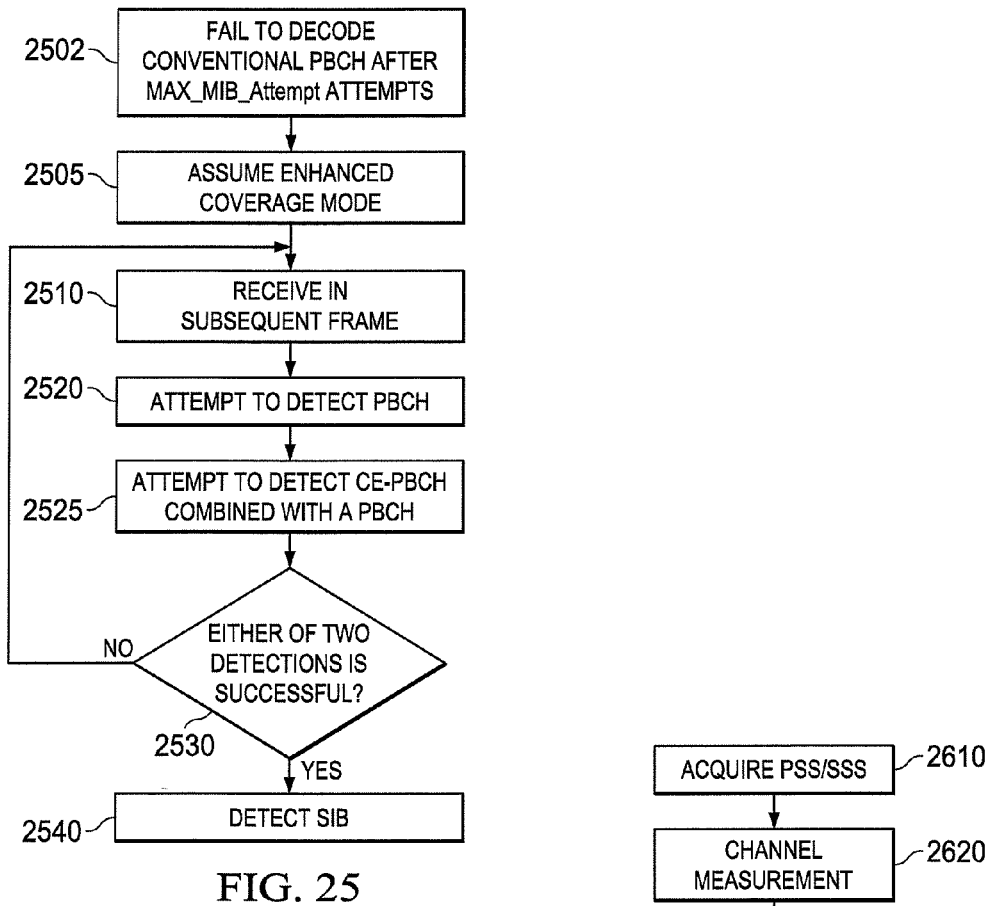
FIG. 25 illustrates example operations for a UE to decode a PBCH, or decode a combined PBCH and CE-PBCH, or decode CE-PBCH according to this disclosure.

FIG. 25 illustrates example operations for a UE to decode a PBCH, or decode a combined PBCH and CE-PBCH, or decode CE-PBCH according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a mobile station.

In operation 2502, UE 114 fails to detect a conventional PBCH after MAX_MIB_Attempt attempts. UE 114 then operates according to a CE mode in operation 2505. UE receives a subsequent frame in operation 2510 and, in operation 2520, UE 114 attempts to detect a conventional PBCH in the subsequent frame. UE 114 also attempts to detect a CE-PBCH (CE-PBCH repetitions) combined with a PBCH in a same frame in case of a same MIB or not combined with a PBCH in case of a different MIB in operation 2525. UE 114 can perform both decoding operations or first decode a PBCH and, if MIB detection fails, decode receptions of CE-PBCH repetitions. In operation 2530, UE 114 determines whether either detection is successful. If either of the two detections is successful, UE 114 proceeds to detect SIB in operation 2540 according to a CE mode. If neither of the two detections is successful, UE 114 repeats operations 2510, 2520, 2525, and 2530.

In certain embodiments, an outer loop for a maximum allowable time for UE 114 to detect a MIB or a CE-MIB applies. If after the maximum allowable time, UE 114 cannot decode PBCH or CE-PBCH, a failure of timeout applies and UE 114 can select another cell. The same can apply to SIB detection with a respective maximum allowable time.

As an alternative to using MAX_MIB_Attempt for UE 114 to determine whether the UE 114 operates in a normal coverage mode or in a CE mode, UE 114 can use a channel measurement or another metric, such as for example a time required to detect PSS/SSS. A same principle can also apply as an alternative to using MAX_SIB_Attempt.

Figure 26:
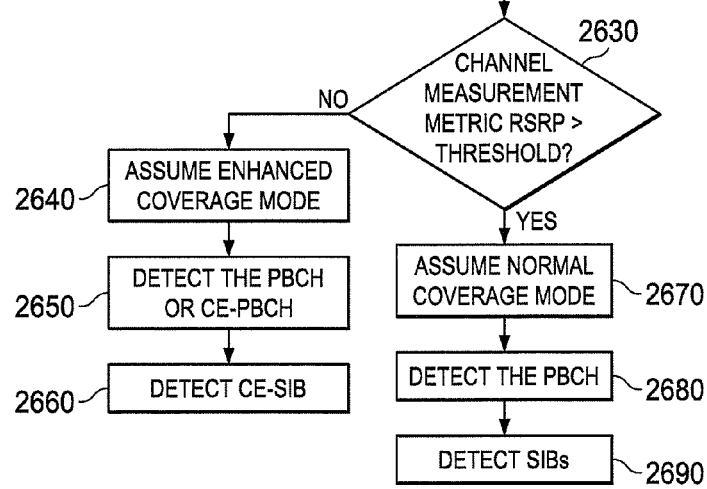
FIG. 26 illustrates an example operation for a UE to determine whether to operate in a normal coverage mode or in a CE mode based on a channel measurement according to this disclosure.

FIG. 26 illustrates an example operation for a UE to determine whether to operate in a normal coverage mode or in a CE mode based on a channel measurement according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a mobile station.

In operation 2610, the UE 114 acquires PSS/SSS. UE 114 then performs a channel measurement in operation 2620, such as a RSRP measurement, and determines whether a channel measurement metric is greater than a threshold that can be predefined in the system operation. For example, in operation 2630, UE 114 determines whether a RSRP measurement is larger than Threshold. If it is, UE 114 operates in normal coverage mode in operation 2670 and accordingly attempts to detect PBCH in operation 2680 and SIBs in operation 2690. If the RSRP measurement is not larger than Threshold in operation 2630, UE 114 operates in CE mode in operation 2660 and accordingly attempts to detect PBCH or CE-PBCH in operation 2650 and CE-SIB in operation 2660.

In certain embodiments, when UE 114 operates in a CE mode, UE 114 informs eNB 102 of a number of decoding attempts that UE 114 needed to detect PSS/SSS, PBCH, CE-PBCH, a SIB, or a CE-SIB, or any combination therefore. UE 114 can provide this information implicitly through a resource selection for a PRACH transmission (for example, a RA preamble selection or a frequency/time resource selection) or explicitly in a PUSCH transmission. eNB 102 can use this information to obtain an estimate of a CE level required by UE 114.

UE 114 can also determine a CE level for selecting a number of repetitions for a subsequent RA preamble transmission based on a number of decoding attempts, including number of combined repetitions for CE-PBCH or CE-SIB, that UE 114 needed to detect PSS/SSS, a PBCH (MIB), a CE-PBCH (CE-MIB), a SIB, a CE-SIB, or any combination thereof. For example, if UE 114 detected PSS/SSS after a first number of attempts (or equivalently, after a first time period) and detected PBCH or CE-PBCH after a second number of attempts, the UE 114 can select a third number of RA preamble repetitions while if UE 114 detected PSS/SSS after a fourth number of attempts (or equivalently, after a second time period) and detected PBCH or CE-PBCH after a fifth number of attempts, UE 114 can select a sixth number of RA preamble repetitions.

Figure 27:
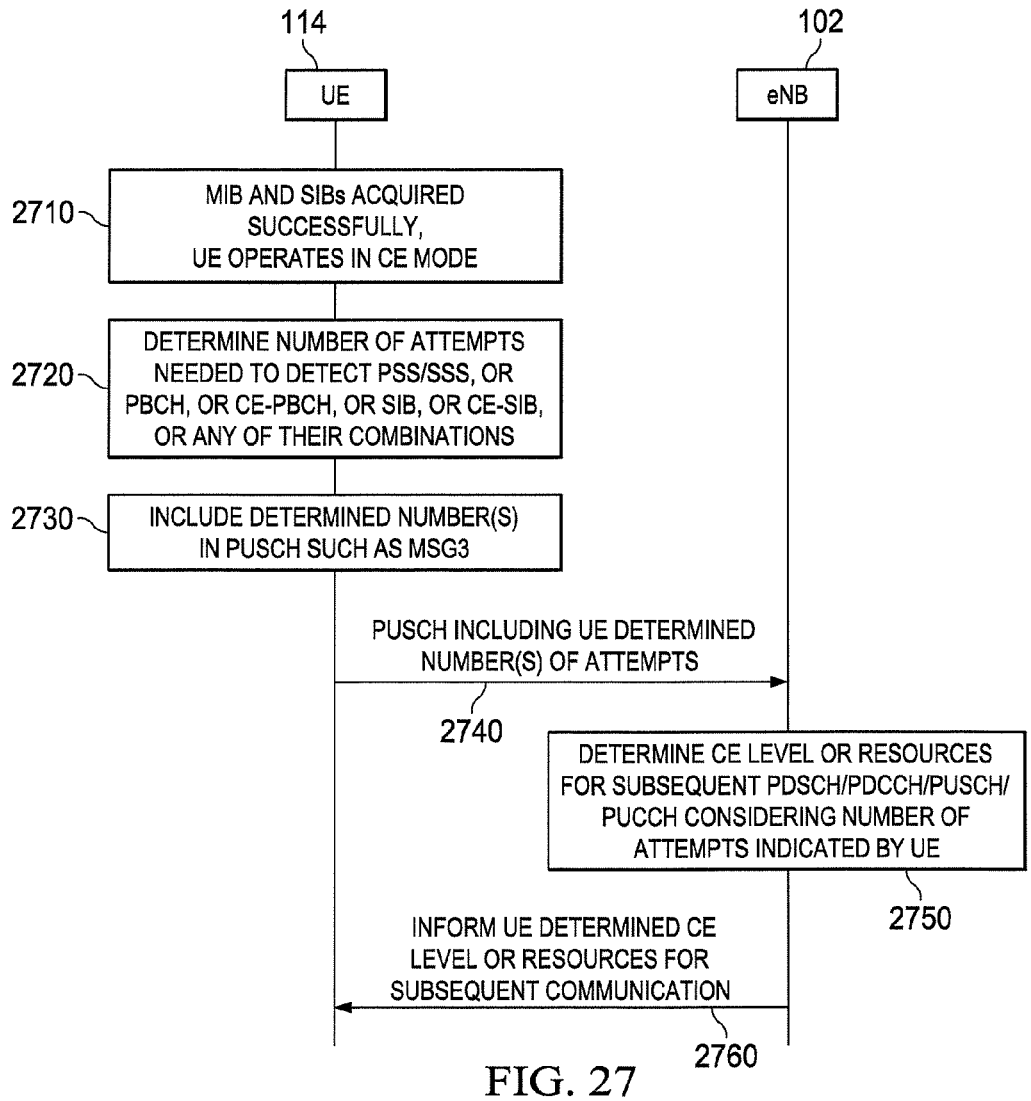
FIG. 27 illustrates example operations for a UE operating in CE mode to explicitly inform an eNB of a number of attempts that the UE required in order to detect one or more of a Primary Synchronization Signal/Secondary Synchronization Signal (PSS/SSS), a PBCH, a CE-PBCH, an SIB, and a CE-SIB according to this disclosure.

FIG. 27 illustrates example operations for a UE operating in CE mode to explicitly inform an eNB of a number of attempts that the UE needed to detect one or more of a PSS/SSS, a PBCH, a CE-PBCH, an SIB, a CE-SIB, or any combination thereof according to this disclosure. While the signaling diagram depicts a series of sequential signals, unless explicitly stated, no inference should be drawn from that sequence regarding specific order of performance, performance of signals (or steps) or portions thereof serially rather than concurrently or in an overlapping manner, or performance of the signals depicted exclusively without the occurrence of intervening or intermediate steps. The process depicted in the example depicted is implemented by a transmitter chain and receiver chains in, for example, a mobile station and base station.

In operation 2710, UE 114 detects MIB and SIB transmitted by eNB 102 and operates in CE mode. In operation 2720, the UE 114 determines a number of decoding attempts that the UE requires to detect PSS/SSS, a PBCH (MIB), a CE-PBCH (CE-MIB), a SIB, a CE-SIB, or any combination thereof. In operation 2730, UE 114 includes the number in a PUSCH, such as Msg3 and transmits the PUSCH 2740 to eNB 102. After successful reception of the PUSCH 2740, in operation 2750, eNB 102 determines a CE level or resources for subsequent PDSCH/PDCCH/PUSCH/PUCCH transmissions to or from UE 114 at least partially based on the number provided by UE 114. Subsequently, eNB 102 can inform a CE level or resources for subsequent communication 2760 to UE 114 by transmitting respective information to UE 114.

Figure 28:
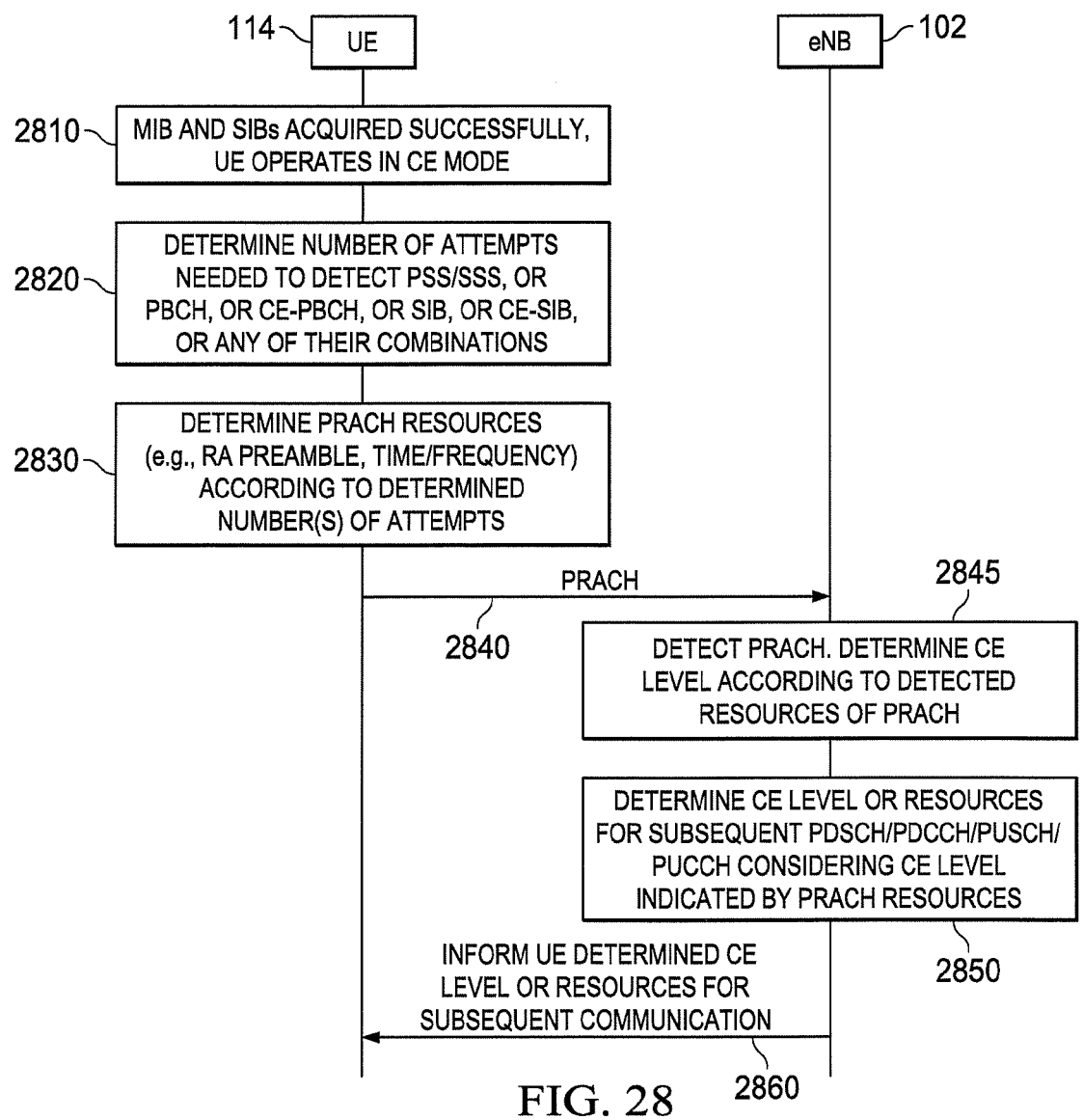
FIG. 28 illustrates example operations for a UE operating in CE mode to implicitly inform an eNB of a number of attempts that the UE required to detect one or more of a PSS/SSS, a PBCH, a CE-PBCH, an SIB, and a CE-SIB according to this disclosure.

FIG. 28 illustrates example operations for a UE operating in CE mode to implicitly inform an eNB of a number of attempts that the UE requires to detect a PSS/SSS, a PBCH, a CE-PBCH, an SIB, a CE-SIB, or any combination thereof according to this disclosure. While the signaling diagram depicts a series of sequential signals, unless explicitly stated, no inference should be drawn from that sequence regarding specific order of performance, performance of signals (or steps) or portions thereof serially rather than concurrently or in an overlapping manner, or performance of the signals depicted exclusively without the occurrence of intervening or intermediate steps. The process depicted in the example depicted is implemented by a transmitter chain and receiver chains in, for example, a mobile station and base station.

In operation 2810, UE 114 detects MIB and SIB transmitted by eNB 102. In operation 2810, the UE 114 operates in CE mode. In operation 2820, the UE 114 determines a number of attempts it required to detect a PSS/SSS, a PBCH (MIB), a CE-PBCH (CE-MIB), an SIB, a CE-SIB, or any combination thereof. In operation 2830, the UE 114 further determines PRACH resources (such as a RA preamble or time/frequency resources) according to determined number of attempts based on a predefined mapping or on a configured mapping (for example, configured by a SIB) between a number of attempts and PRACH resources. UE 114 then transmits a RA preamble 2840 to eNB 102. Upon detecting the RA preamble, in operation 2845, eNB 102 determines a CE level suggested by UE 114 according to resources used by the detected RA preamble. The determination can be based on an association between RA preamble resources and CE level. In operation 2850, the eNB 102 can determine a CE level or resources for subsequent PDSCH/PDCCH/PUSCH/PUCCH transmissions to or from UE 114 at least partly based on the CE level indicated by the detected RA preamble. The eNB 102 can inform the determined CE level or resources for subsequent communication 2860 through DL signaling to UE 114.

Figure 29:
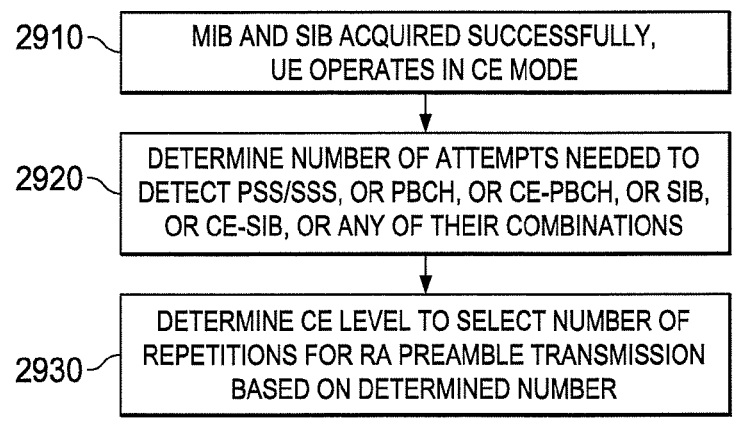
FIG. 29 illustrates example operations for a UE to determine a CE level for selecting a number of repetitions for a RA preamble transmission based on a number of decoding attempts the UE required to detect PSS/SSS, or a PBCH, or a CE-PBCH, or a SIB, or a CE-SIB, or any of their combinations according to this disclosure.

FIG. 29 illustrates example operations for a UE to determine a CE level for selecting a number of repetitions for a RA preamble transmission based on a number of decoding attempts that the UE requires to detect a PSS/SSS, a PBCH, a CE-PBCH, an SIB, a CE-SIB, or any combination thereof according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a mobile station.

In operation 2910, UE 114 detects MIB and SIB and operates in CE mode. The UE 114 determines a number of attempts it required to detect PSS/SSS, or PBCH (MIB), or CE-PBCH (CE-MIB), or a SIB, or a CE-SIB, or any of their combinations in operation 2920. Then, in operation 2930, the UE 114 determines a CE level for selecting a number of repetitions for a subsequent RA preamble transmission based on the number of attempts (including number of repetitions for CE-SIB reception) that the UE requires to detect PSS/SSS, or PBCH, or CE-PBCH, or SIB, or CE-SIB, or any of their combinations.

In certain embodiments, repetitions for transmissions of DL channels are considered in conjunction with an existence of MBSFN SFs.

For either a TDD system or a FDD system, a transmission of a PBCH segment or in a frame can be repeated multiple times in order to provide a respective CE level (CE-PBCH). Therefore, each CE-PBCH segment can be transmitted over a larger number of SFs than a conventional PBCH but a CE-PBCH segment is also transmitted only in the central 72 sub-carriers (6 RBs) in a DL operating bandwidth of a cell. The PDSCH conveying the CE-SIB can also be transmitted over a larger number of SFs than a PDSCH conveying a SIB.

As previously illustrated, SF#0, SF#4, SF#5, and SF#9 for FDD and SF#0, SF#1, SF#5, and SF#6 for TDD cannot be configured as MBSFN SFs. Remaining SFs in a frame can be configured as MBSFN SFs. If CE-PBCH or CE-SIB PDSCH resources are in some of these SFs, UE 114 may not know the ones configured as MBSFN SFs when attempting to detect a CE-MIB or a CE-SIB (it is assumed that a CE-MIB does not provide information for the MBSFN SFs in a frame). Then, UE 114 needs to perform hypothesis testing assuming some SFs are unicast ones and remaining SFs are MBSFN ones. This increases receiver complexity and power consumption for UE 114. For TDD, resources for CE-PBCH or CE-SIB PDSCH repetitions can be in SF#0, SF#1, SF#5, SF#6, and SF#9 where only SF#9 can be configured as MBSFN SF. As UE 114 cannot know whether or not SF#9 is configured as an MBSFN SF, UE 114 needs to perform hypothesis testing as for FDD when attempting to detect the CE-MIB or a CE-SIB thereby again resulting to increased receiver complexity and power consumption for UE 114. To assist UE 114 in reducing a level of hypothesis testing, the following approaches are considered.

In a first approach, MBSFN SFs and SFs with CE-PBCH repetitions or CE-SIC PDSCH are orthogonal in the time domain. UE 114 assumes that all SFs used to transmit CE-PBCH or CE-SIB PDSCH are unicast SFs. One option to realize such operation in practice is to configure MBSFN SFs only for a subset of SFs where CE-PBCH or CE-SIB PDSCH is not transmitted. For example, for intermittent CE-PBCH or CE-SIB PDSCH transmission, MBSFN SFs can be configured in frames where CE-PBCH or CE-SIB is not transmitted. Alternatively, to maintain backward compatibility with existing UEs that are not aware of CE-PBCH or CE-SIB PDSCH repetitions, eNB 102 does not transmit CE-PBCH or CE-SIB PDSCH in any SF that can be configured as MBSFN SF. Therefore, for commonality of CE-PBCH repetitions in FDD and TDD, transmission of CE-PBCH repetitions can occur only in SF#0 and SF#5. The same can apply for transmissions of a CE-SIB as UE 114 cannot be aware of the MBSFN SF pattern (this information is assumed to be included in the CE-SIB and not provided by CE-MIB). Alternatively, if this commonality for FDD and TDD is not required, transmission of CE-PBCH repetitions or CE-SIB repetitions can be only in SFs that cannot be configured as MBSFN SFs (such as, for example, SF#0 and SF#5 for CE-PBCH transmission and SFs#0, 4, 5, 9 in FDD and SFs#0, 1, 5, 6 in TDD can be used for CE-SIB PDSCH transmission).

In a second approach, eNB 102 overrides a configuration of a SF as an MBSFN SF when transmitting CE-PBCH in that SF. The overriding can be only in the middle 6 RBs where CE-PBCH is transmitted while in the remaining part of a DL operating bandwidth a configuration of a SF as an MBSFN one can remain valid. Therefore, eNB 102 can transmit CRS as in a unicast SF in the middle 6 RBs of a DL operating bandwidth while transmitting CRS as in a MBSFN SF in the remaining part of the DL operating bandwidth. UE 114 assumes that all SFs used to transmit CE-PBCH are unicast SFs. No other DL channel (for control or data) is transmitted in resources used to transmit CE-PBCH. The second approach is valid when a same CP (normal or extended) is used both for unicast SFs and MBSFN SFs. The same can apply for transmissions of a CE-SIB PDSCH where the overriding can be only in respective RBs.

Figure 30:
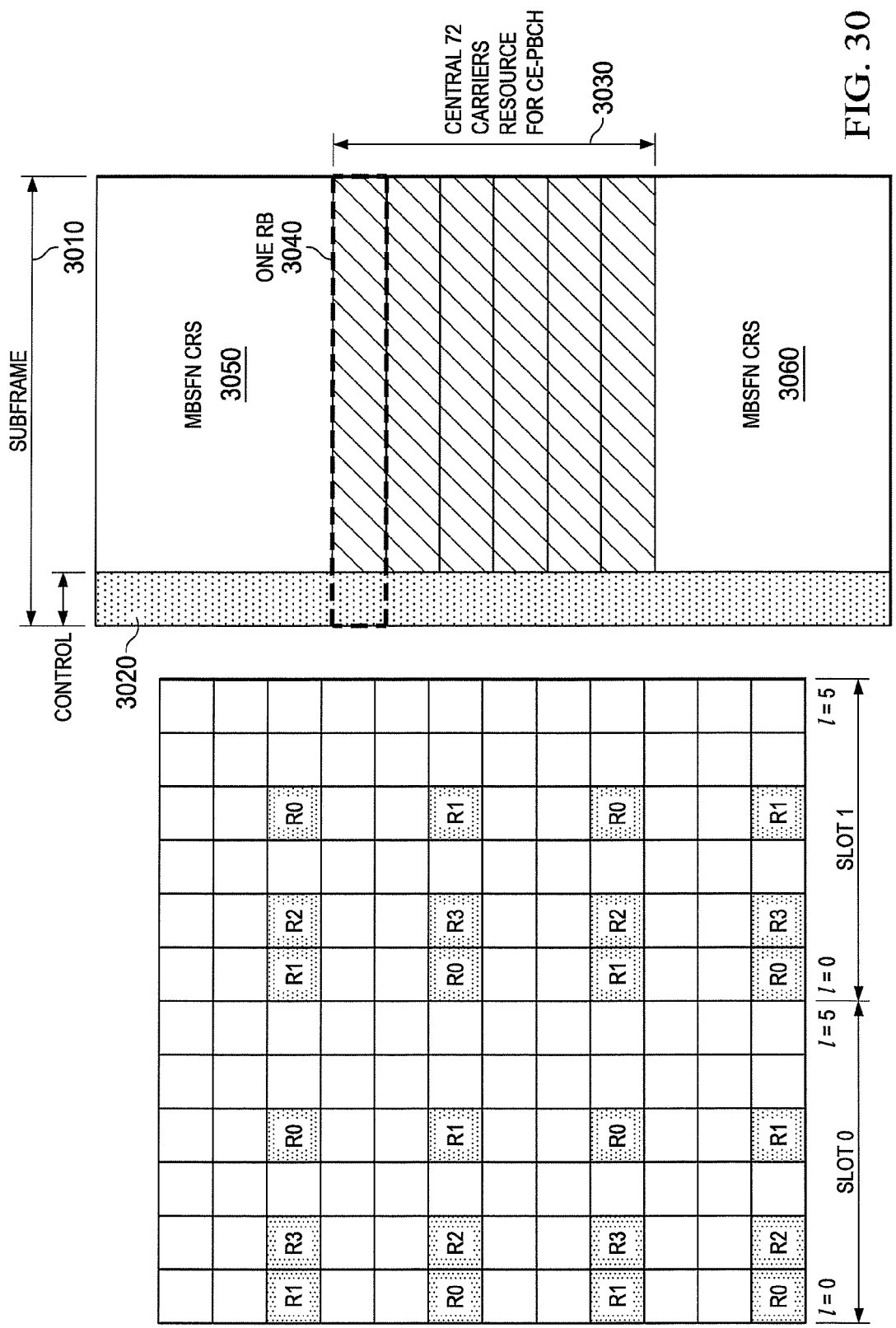
FIG. 30 illustrates an example operation for an eNB to transmit CE-PBCH repetitions in the middle 6 RBs of a DL operating bandwidth in a SF configured as Multicast-Broadcast Single Frequency Network (MBSFN) SF according to this disclosure.

FIG. 30 illustrates an example operation for an eNB to transmit CE-PBCH repetitions in the middle 6 RBs of a DL operating bandwidth in a SF configured as MBSFN SF according to this disclosure. The embodiment of the operation shown in FIG. 30 is for illustration only. Other embodiments could be used without departing from the scope of the present disclosure.

Referring to FIG. 30, a SF 3010 is configured as MBSFN and a control region 3020 can be the first one or two symbols. The middle 72 sub-carriers (6 RBs) 3030 excluding the control region can be used for transmission of CE-PBCH repetitions where for each RB 3040, a CRS pattern can be as in a unicast SF. The remaining regions of the SF 3010 contain CRS 3050 as for a MBSFN SF 3060.

After CE-PBCH detection, the UE 114, with connection to eNB 102 and operating in CE mode, can be informed (i.e., can receive from the eNB 102) of a MBSFN SF pattern used by eNB 102 and can exclude such SFs from reception of PDSCH or EPDCCH repetitions. The MBSFN SF pattern can be provided by CE-SIB. Alternatively, UE 114 can be informed of SFs in the MBSFN SF pattern to include for reception of PDSCH or EPDCCH repetitions.

In a third approach, for a SF that can be configured as MBSFN SF, resources that can be used by eNB 102 to transmit CE-PBCH exclude CRS in both unicast SFs and MBSFN SFs. For example, for TDD and SF#9, resources that can be used by eNB 102 to transmit CE-PBCH do not include a joint set of CRS sub-carriers corresponding to either a unicast SF or an MBSFN SF. UE 114 can estimate a DL channel assuming an existence of either a unicast SF or a MBSFN SF. The same can apply for transmissions of a CE-SIB PDSCH.

Figure 31:
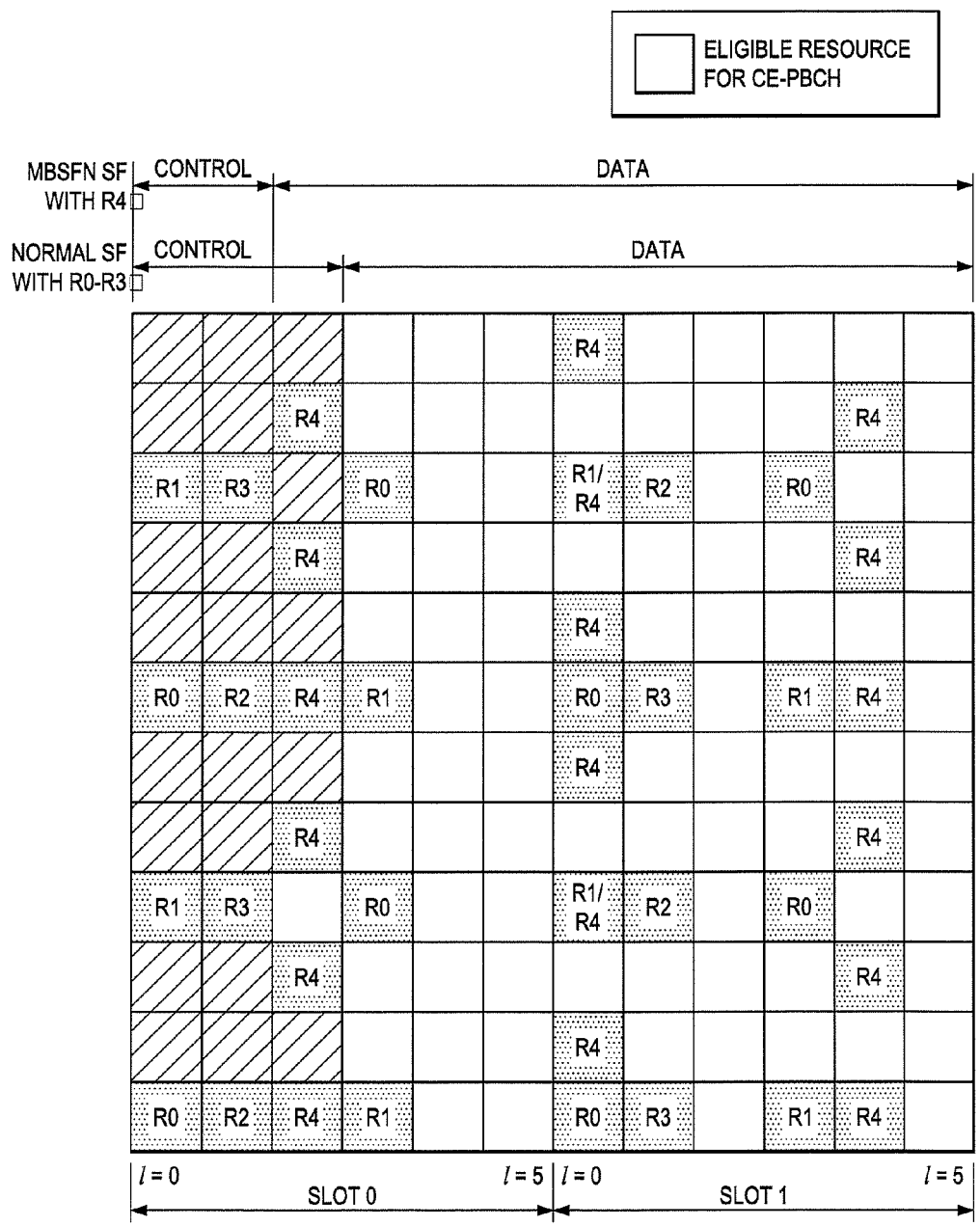
FIG. 31 illustrates an example for resources an eNB can use to transmit CE-PBCH in an RB and in a SF that is configured as a MBSFN SF according to this disclosure.

FIG. 31 illustrates an example for resources an eNB can use to transmit CE-PBCH in an RB and in a SF that is configured as a MBSFN SF according to this disclosure. The embodiment of the resources shown in FIG. 31 is for illustration only. Other embodiments could be used without departing from the scope of the present disclosure. In the example shown in FIG. 31, resources used by eNB 102 to transmit CE-PBCH exclude a control region, CRS R0-R3 for a unicast SF, and CRS R4 for a MBSFN SF.

A UE with connection to eNB 102, can be informed by eNB 102 of a CE-PBCH repetition pattern or of a repetition pattern for a PDSCH conveying a CE-SIB if the PDSCH is not dynamically scheduled by eNB 102, for example by higher layer signaling such as Radio Resource Control (RRC) signaling, and can puncture resources, if any, that are allocated for reception of a DL channel and overlap with resources used to transmit CE-PBCH repetitions or the PDSCH repetitions. A CE-PBCH repetition pattern or a repetitions pattern for a PDSCH conveying the CE-SIB can include a bitmap indicating frames with CE-PBCH transmission (or quadruples of frames as a CE-PBCH can be transmitted in four self-decodable segments over respective frames) or frames with PDSCH transmission. In case a set of SFs with transmission of CE-PBCH or with transmission of the PDSCH in a frame is not predetermined in a system operation, the bit-map can also include a component indicating a subset of SFs, from a set of SFs within a frame that can include CE-PBCH transmission or the PDSCH transmission.

In certain embodiments, a pattern of CE-PBCH transmissions or a pattern of PDSCH transmissions conveying a CE-SIB can be signaled among eNBs over an X2 interface or via a HeNB gateway if an X2 interface is not available. Based on the CE-PBCH transmission pattern or on the PDSCH transmission pattern, an eNB can determine ABS for which the eNB cannot assume that an interfering eNB applies power reduction in the central 6 RBs of a DL operating bandwidth (due to transmission of CE-PBCH) or on other signaled RBs (due to transmission of PDSCH conveying the CE-SIB) and accordingly adjust its scheduling decisions.

A first eNB that is signaled from a second interfering eNB an ABS pattern and a CE-PBCH or CE-SIB transmission pattern that the second eNB applies to its transmissions, can assume that the CE-PBCH or CE-SIB transmission pattern overrides the ABS pattern in the middle 6 RBs of the DL operating bandwidth of the second eNB in a SF that is indicated as both being an ABS one (based on the ABS pattern) and one with CE-PBCH or CE-SIB transmission (based on the CE-PBCH or CE-SIB transmission pattern). The CE-PBCH or CE-SIB transmission pattern can be explicitly signaled. Alternatively, if the CE-PBCH or CE-SIB transmission pattern can be determined by specification or implicitly, such as for example using a mapping function from PCID, the CE-PBCH or CE-SIB transmission pattern may not be explicitly signaled over the X2 interface. Additionally, the SFs and RBs within a frame where the second eNB transmits CE-PBCH or CE-SIB are determined by specification. For example, a CE-PBCH transmission can be in the central 6 RBs and in SF#0 or SF#5. Then, the CE-PBCH transmission pattern need only include respective frames or quadruples of frame. If the CE-PBCH or the CE-SIB transmission pattern can be determined by specification, such as for example using a predefined mapping function from certain configurable parameters, then the parameters can be signaled and the CE-PBCH or CE-SIB transmission pattern can be derived by UE 114 based on the received parameters.

For example, for CE-PBCH repetitions within 4 frames, parameters related to resources used by eNB 102 to transmit CE-PBCH repetitions include a starting frame with SFN satisfying (MSB8_SFN)mod N=m as it was previous described in the third embodiment.

Figure 32:
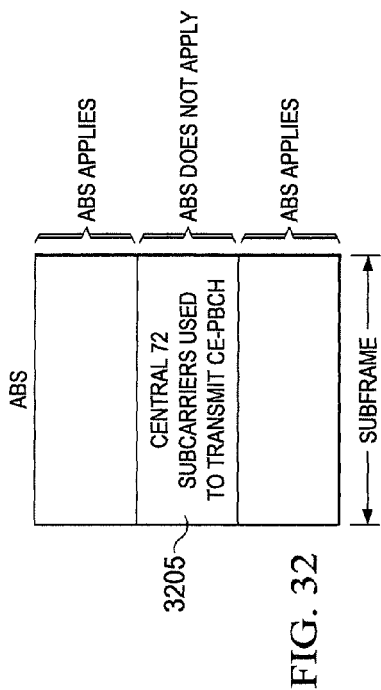
FIG. 32 illustrates an example Almost Blank Subframe (ABS) pattern where a first eNB cannot assume that an interfering second eNB applies reduced transmission power in the central 6 RBs of a DL operating bandwidth according to this disclosure.

FIG. 32 illustrates an example ABS pattern where a first eNB cannot assume that an interfering second eNB applies reduced transmission power in the central 6 RBs of a DL operating bandwidth according to this disclosure. The embodiment of the ABS pattern shown in FIG. 32 is for illustration only. Other embodiments could be used without departing from the scope of the present disclosure.

Referring to FIG. 32, eNB 101 is signaled an ABS pattern and a SF pattern for CE-PBCH or CE-SIB transmissions from eNB 102. Then, if an ABS aligns with a SF containing resources for a CE-PBCH or CE-SIB transmission, eNB 101 cannot assume that eNB 102 transmits with reduced power (including zero power) in the center 72 sub-carries (6 RBs) 3205 of a DL operating bandwidth for CE-PBCH transmission or in signaled RBs for CE-SIB transmission while it can make such an assumption for the remaining RBs.

Table 3 provides example information for a CE-PBCH or CE-SIB transmission pattern for an eNB that is exchanged with other eNBs. If a parameter is fixed or predefined in the specification of the system operation, it does not need to be included in the signaling.

TABLE 3

Information for a CE-PBCH or CE-SIB transmission pattern

| Information field | Usage |
|---|---|
| Periodicity N | CE-PBCH or CE-SIB transmission periodicity |
| Starting Frame | Starting Frame for transmission pattern |
| Starting Subframe | Starting SF in the starting frame |
| Number of repetitions | Number of repetitions for CE-PBCH or CE-SIB |
| RBs | RBs used to transmit CE-PBCH or CE-SIB |
| DL Bandwidth | DL bandwidth for eNB signaling ABS and CE-PBCH or CE-SIB transmission pattern |

Table 4 provides alternative example information for a CE-PBCH or CE-SIB transmission pattern for an eNB that is exchanged with other eNBs. If there are predefined patterns for CE-PBCH or CE-SIB transmissions, the signaling can include a respective repetition pattern index.

TABLE 4

Information for a CE-PBCH or CE-SIB transmission pattern

| Information field | Usage |
|---|---|
| CE-PBCH or CE-SIB transmission pattern index | Indicate which pattern an eNB uses for CE-PBCH or CE-SIB transmissions |

For example, there can be four repetition patterns, with pattern index value '00', '01', '10', '11'. If the resources for CE-PBCH or CE-SIB transmission within a frame are determined by specification or are fixed or predetermined, the pattern for CE-PBCH or CE-SIB transmission can be related to which frame contains CE-PBCH or CE-SIB transmissions.

Figure 33:
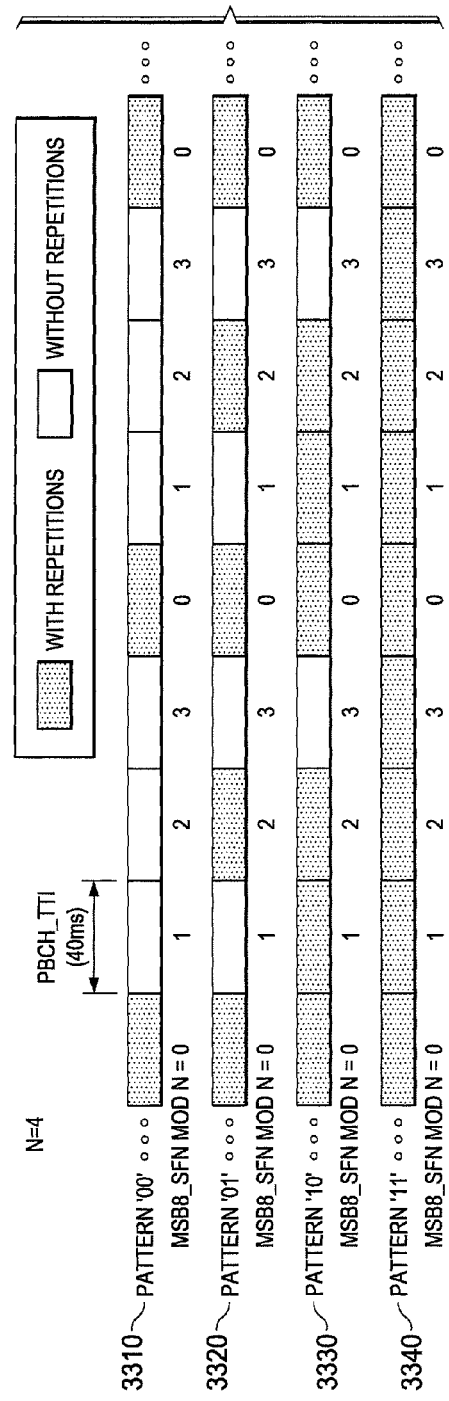
FIG. 33 illustrates an example set of CE-PBCH or CE-SIB transmission patterns according to this disclosure.

FIG. 33 illustrates an example set of CE-PBCH or CE-SIB transmission patterns according to this disclosure. The embodiment of the CE-PBCH or CE-SIB transmission patterns shown in FIG. 33 is for illustration only. Other embodiments could be used without departing from the scope of the present disclosure.

In the example shown in FIG. 33, there are four patterns. If pattern '00' 3310 is indicated by an eNB, a first set of frames contains CE-PBCH or CE-SIB repetitions while other frames do not contain CE-PBCH or CE-SIB repetitions. If pattern '01' 3320 is indicated by an eNB, a second set of frames contain CE-PBCH or CE-SIB repetitions while other frames do not contain CE-PBCH or CE-SIB repetitions. If pattern '10' 3330 is indicated by an eNB, a third set of frames contain CE-PBCH or CE-SIB repetitions while other frames do not contain CE-PBCH or CE-SIB repetitions. If pattern '11' 3340 is indicated by the eNB, all frames contain CE-PBCH or CE-SIB repetitions.

For example, if a number for CE-PBCH or CE-SIB transmission within a frame can be more than a single one, a pattern for CE-PBCH or CE-SIB repetitions can be associated to a CE-PBCH or CE-SIB repetition level within a frame and to a frame containing CE-PBCH or CE-SIB repetitions, respectively.

Figure 34:
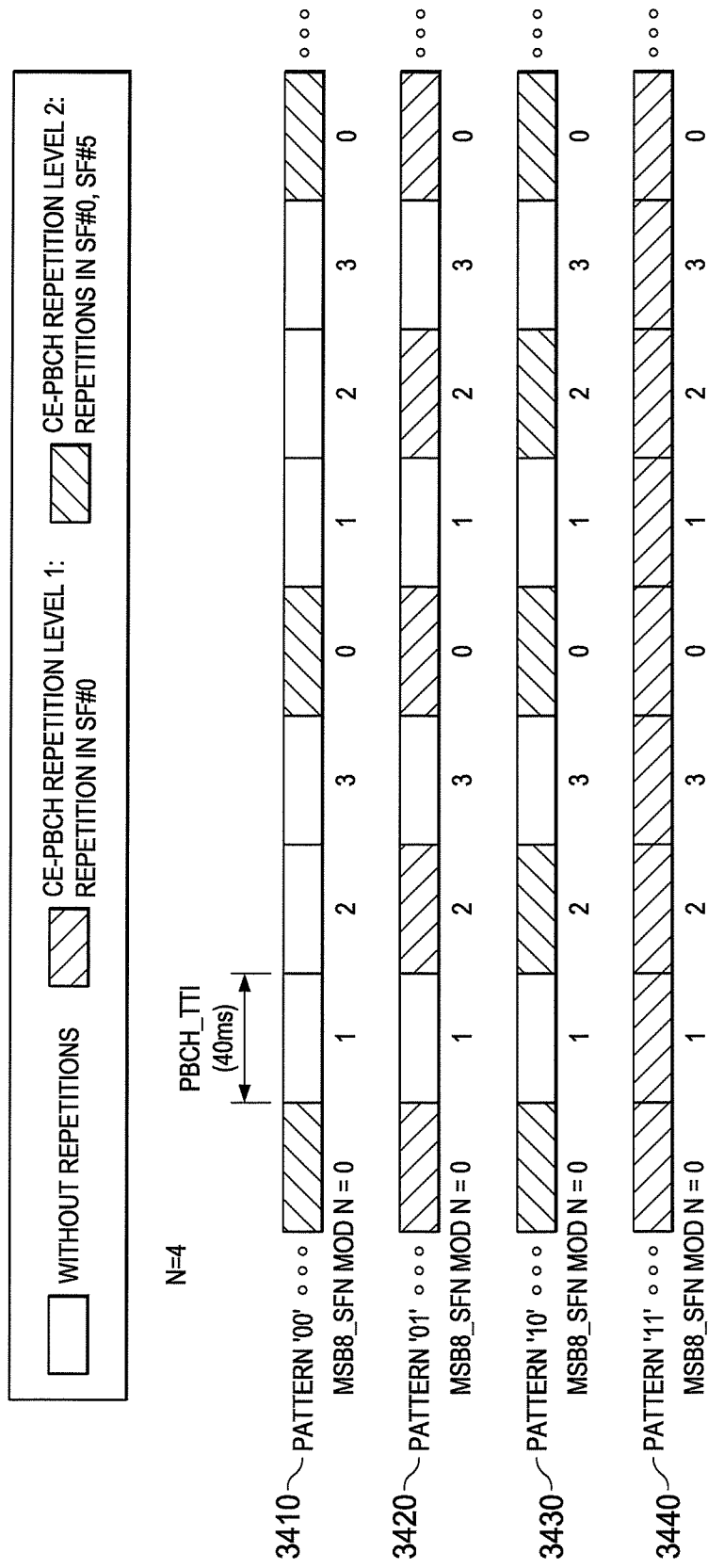
FIG. 34 illustrates an example set of CE-PBCH or CE-SIB transmission patterns for more than one repetition levels according to this disclosure.

FIG. 34 illustrates an example set of CE-PBCH or CE-SIB transmission patterns for more than one repetition levels according to this disclosure. The embodiment of the CE-PBCH or CE-SIB transmission patterns shown in FIG. 33 is for illustration only. Other embodiments could be used without departing from the scope of the present disclosure.

In the example shown in FIG. 34, there are four patterns. If pattern '00' is indicated 3410, frames with (MSB8_SFN) mod 4=0 contain CE-PBCH transmission with repetition level 2 within a frame (transmissions of CE-PBCH repetitions are only in SF#0 and SF#5). If pattern '01' is indicated 3420, frames with (MSB8_SFN)mod 4=0 or (MSB8_SFN) mod 4=2 contain CE-PBCH transmission with repetition level 1 within a frame (transmissions of CE-PBCH repetitions are only in SF#0). If pattern '10' is indicated 3430, frames with (MSB8_SFN)mod 4=0 or (MSB8_SFN)mod 4=2 contain CE-PBCH transmission with repetition level 1 within a frame. If pattern '11' is indicated 3440, it means all frames contain MTC-PBCH transmissions with repetition level 1 within each such frame.

Figure 35:
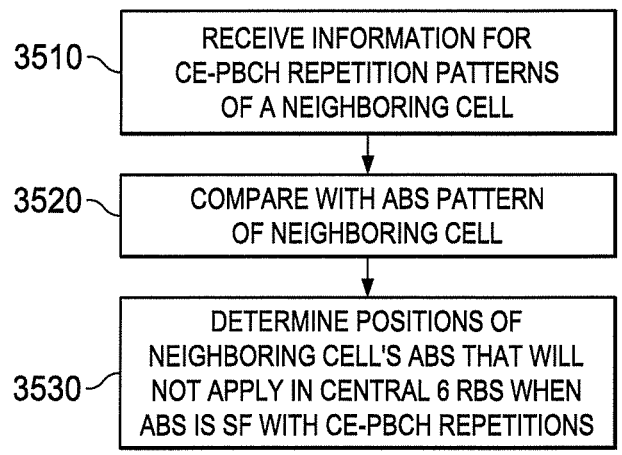
FIG. 35 illustrates example operations for an eNB after receiving information for a pattern of CE-PBCH or CE-SIB transmissions according to this disclosure.

FIG. 35 illustrates example operations for an eNB after receiving information for a pattern of CE-PBCH or CE-SIB transmissions according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a mobile station.

In operation 3510, eNB 101 receives information for a pattern of CE-PBCH or CE-SIB transmissions and an ABS pattern from eNB 102 (eNB 101 can derive the CE-PBCH or CE-SIB transmission pattern according to the received information if the pattern is determined by a mapping function). In operation 3520, eNB 101 compares the received CE-PBCH or CE-SIB transmission pattern with the ABS pattern and determines the SFs of the ABS pattern where it cannot assume that eNB 102 transmits with reduced power in the central 6 RBs of its DL operating bandwidth. In operation 3530, the determination by eNB 101 is based on SFs indicated by the ABS pattern as being ones that eNB 102 transmits with reduced power that are also SFs indicated by the CE-PBCH or CE-SIB transmission pattern as being ones that eNB 102 transmits CE-PBCH or CE-SIB repetitions 3530.

For PDSCH or EPDCCH repetitions, eNB 102 can inform UE 114 operating in CE mode of an ABS pattern, for example through a CE-SIB or by RRC signaling. UE 114 can then assume that repetitions of a PDSCH or EPDCCH transmission from eNB 102 are in SFs that exclude SFs indicated as ABS by the ABS pattern. Alternatively, similar to CE-PBCH or CE-SIB repetitions, eNB 102 can inform eNB 101 of specific RBs where eNB 102 may not transmit with reduced power even in SFs indicated as ABS by the ABS pattern that eNB 102 informs to eNB 101.

In certain embodiments, information for a CE-PBCH or CE-SIB transmission pattern can be provided to a UE operating in normal coverage mode, such as UE 116, for example by higher layer signaling such as RRC signaling or Medium Access Control (MAC) signaling. If transmissions for a CE-PBCH or CE-SIB are in predetermined SFs within a frame and in predetermined RBs for each respective SF, such as for example in SF#0 and SF#5 and in symbols not assumed to be used for PDCCH or PSS/SSS or PBCH transmission, UE 116 needs only be informed of a SFN for a frame of a first CE-PBCH segment repetition or of a first CE-SIB repetitions and of a periodicity for CE-PBCH or CE-SIB intermittent transmissions. If transmissions for a CE-SIB are not in predetermined RBs, the RBs need to also be signaled to the UE operating in a normal coverage mode.

For example, for 16 possible values of CE-PBCH or CE-SIB transmission periodicity in frames, signaling to UE 116 can include a 10-bit SFN value indicating a frame for transmission of a first CE-PBCH segment or of a first CE-SIB repetition and a 4-bit value indicating a periodicity. Alternatively, information for a CE-PBCH or a CE-SIB repetition pattern can be as shown in Table 3 or Table 4. If repetitions for a CE-PBCH segment are not in predetermined SFs within a frame, SFs for repetitions of a CE-PBCH segment within a frame or symbols for each respective SF need to also be signaled to UE 116. Further, if transmissions for a CE-SIB are not in predetermined RBs, the RBs need to also be signaled to UE 116. Based on this information, UE 116 can determine SFs and RBs where it can receive other DL signaling, such as PDSCH, EPDCCH, or CSI-RS, in the middle 6 RBs that are not used for CE-PBCH repetitions or in the RBs that are not used for CE-SIB repetitions and SFs and RBs where it is not expected to receive such signaling.

Figure 36:
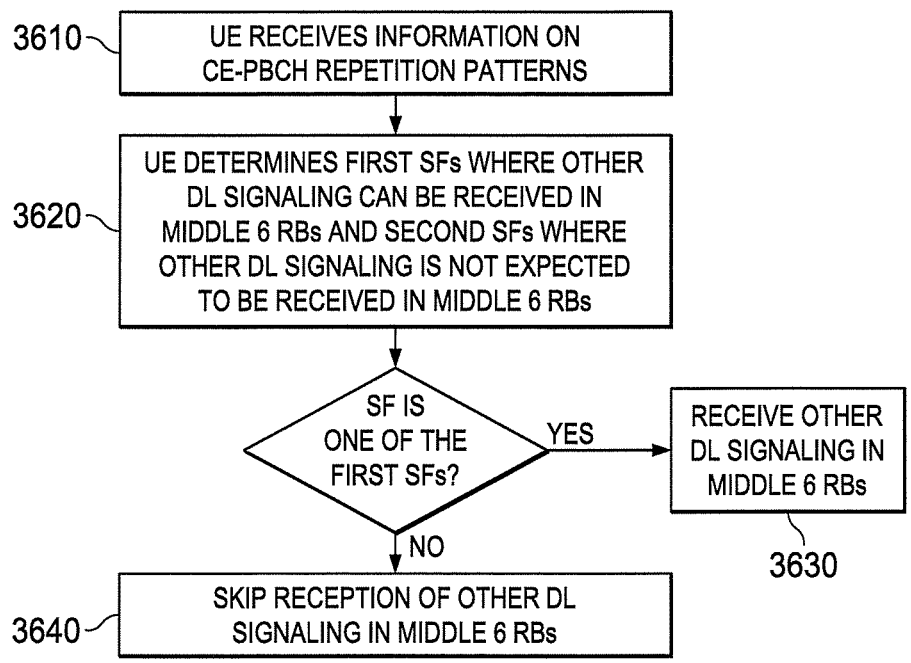
FIG. 36 illustrates example operations for a UE operating in a normal (non-CE) mode after receiving information for a CE-PBCH or CE-SIB transmission pattern according to this disclosure.

FIG. 36 illustrates example operations for a UE operating in a normal (non-CE) mode after receiving information for a CE-PBCH or CE-SIB repetitions pattern according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a mobile station.

In operation 3610, UE 116 receives information for a CE-PBCH or a CE-SIB repetition pattern. In operation 3620, UE 116 then determines first SFs where it can receive other DL signaling, such as PDSCH, EPDCCH, or CSI-RS, in the middle 6 RBs and second SFs where it is not expected to receive such signaling. For reception of other DL signaling in a SF, UE 116 receives the other DL signaling in the middle 6 RBs in operation 3630 if the SF is one of the first SFs and UE 116 skips reception of the other DL signaling in the middle 6 RB if the SF is one of the second SFs in operation 3640. For CE-SIB transmissions, the respective RBs need to also be signaled if, unlike the CE-PBCH RBs, they are not predetermined in the system operation.

In certain embodiments, information for a CE-PBCH or a CE-SIB transmission pattern can be provided to a UE operating in CE mode and having established connection with an eNB, for example, via signaling such as SIB or higher layer signaling such as RRC signaling or MAC signaling.

If repetitions for a CE-PBCH segment or for a CE-SIB are in predetermined SFs and RBs within a frame, UE 114 operating in CE mode needs only be informed of the SFN for the frame of the first CE-PBCH segment repetition or of the first CE-SIB repetition and of the periodicity of the CE-PBCH or CE-SIB intermittent transmissions. For example, for 16 possible values of CE-PBCH or CE-SIB transmission periodicity in frames, signaling to UE 114 can include a 10-bit SFN value indicating the frame for the transmission of the first CE-PBCH segment or of the first CE-SIB repetition and a 4-bit value indicating the periodicity. Alternatively, the information for a CE-PBCH or CE-SIB repetition pattern can be as shown in Table 3 or Table 4. If repetitions for a CE-PBCH segment or a CE-SIB are not in predetermined SFs within a frame, SFs for repetitions of a CE-PBCH segment or of CE-SIB within a frame need to also be signaled to UE 114. If repetitions for a CE-SIB are not in predetermined RBs, the RBs for repetitions of CE-SIB need to also be signaled to UE 114. Based on this information, UE 114 can determine SFs and RBs where it can discard received signaling for PDSCH or EPDCCH reception as eNB 102 transmits CE-PBCH or CE-SIB.

The eNB 102 can also provide information for CE-PBCH or CE-SIB transmission patterns for one or more neighboring eNBs to UE 114 (such as for an eNB 101 that UE 114 may handover to or associate with) to assist UE 114 to perform handover or cell association.

eNB 102 can adapt or reconfigure a CE-PBCH repetition pattern over time. For example, if over a period of time there are no active UEs operating in CE mode as such UEs can be in a discontinuous reception (DRX) state (see also REF 5), eNB 102 can avoid CE-PBCH transmissions. eNB 102 can configure by RRC signaling the DRX pattern of UEs operating in CE mode. eNB 102 can adjust a rate of transmissions for CE-PBCH repetitions or a number of CE-PBCH repetitions in a frame based on the (potentially time-varying) CE requirements of UEs with eNB 102 as their serving eNB. Prior to or after a reconfiguration of a CE-PBCH or CE-SIB repetition pattern, eNB 102 can inform UEs, through RRC signaling or through a SIB, of a new configuration for a CE-PBCH or CE-SIB transmission pattern.

UE 114 operating in CE mode can use a cached CE-PBCH or CE-SIB transmission pattern when attempting to detect a CE-MIB or a CE-SIB transmitted by CE-PBCH repetitions or PDSCH repetitions, respectively, from eNB 102.

UE 114 operating in CE mode can also be signaled a presence of other DL signaling, such as a configuration for CSI-RS signaling in respective SFs, in SFs of a frame and a periodicity so that UE 114 can know to avoid receiving PDSCH conveying a CE-SIB (or any other PDSCH) in SFs and in REs where a eNB 102 transmits CSI-RS.

A CE-MIB can include information for resources (SFs or RBs) that eNB 102 uses to transmit a CE-SIB. A respective information field in the CE-MIB can be an indicator for a configuration of CE-SIB or an index of a configuration of CE-SIB, where the configuration of CE-SIB can be a set of resources (SFs or RBs) for one or multiple transmissions (repetitions) of CE-SIB, or a number of CE-SIB repetitions, and so on. Alternatively, the CE-MIB can include information related to a number of repetitions for a PDSCH conveying a CE-SIB and UE 114 can determine the resources eNB 102 uses to transmit CE-SIB from a predefined mapping function or a predefined mapping table that maps a number of repetitions for a PDSCH conveying a CE-SIB to RBs or SFs that eNB 102 uses to transmit CE-SIB.

Although the present disclosure has been described with example embodiments, various changes and modifications may be suggested to one skilled in the art. It is intended that the present disclosure encompass such changes and modifications that fall within the scope of the appended claims.

What is claimed is:

1. A method comprising:
  transmitting, by a base station in a cell having a bandwidth, a first system information block (SIB) within a frame that includes a predetermined number of subframes,
  wherein:
    the first SIB, first SIB includes a bit-map of X bits having a one-to-one mapping with subframes from a set of X subframes;
    a subframe from the set of X subframes that is mapped to a bitmap value of '0' belongs to a first subframe set and a subframe from the set of X subframes that is mapped to a bitmap value of '1' belongs to a second subframe set; and
    the base station transmits a control channel or a data channel only in subframes of the first subframe set.

2. The method of claim 1, further comprising:
  transmitting, by the base station, a master information block (MIB), wherein the MIB includes a field having a value mapping to a predetermined configuration of transmission parameters for the first SIB.

3. The method of claim 2, wherein the transmission parameters include a set of subframes within the frame.

4. The method of claim 2, wherein the transmission of the first SIB are in frequency resources that are determined as a function of a physical cell identity and the bandwidth overlapping with seventy-two center sub-carriers of the bandwidth.

5. The method of claim 2, wherein when a transmission of the control channel or of the data channel is in a same subframe as a transmission of the MIB or the first SIB repetition, the transmission of the control channel or of the data channel is not mapped to frequency resources used by the transmission of the MIB or of the first SIB, respectively.

6. The method of claim 2, wherein the MIB transmission is repeated in more than one subframe per frame and in subframe symbols that exclude the first three subframe symbols in each of the more than one subframes.

7. A base station comprising:
a transmitter configured to transmit, in a cell having a bandwidth, a first system information block (SIB) within a frame that includes a predetermined number of subframes, and a control channel or a data channel, wherein:
the first SIB includes a bit-map of X bits having a one-to-one mapping with subframes from a set of X subframes;
a subframe from the set of X subframes that is mapped to a bitmap value of '0' belongs to a first subframe set and a subframe from the set of X subframes that is mapped to a bitmap value of '1' belongs to a second subframe set; and
the transmission of the control channel or of the data channel is only in subframes of the first subframe set.

8. The base station of claim 7, further comprising:
a transmitter configured to transmit a master information block (MIB), wherein the MIB includes a field having a value mapping to a predetermined configuration of transmission parameters for the first SIB.

9. The base station of claim 8, wherein the transmission parameters include a set of subframes within the frame.

10. The base station of claim 8, wherein the transmission of the first SIB are in frequency resources that are determined as a function of a physical cell identity and the bandwidth and exclude frequency resources overlapping with seventy-two center sub-carriers of the bandwidth.

11. The base station of claim 8, wherein when a transmission of the control channel or of the data channel is in a same subframe as a transmission of the MIB or of the first SIB, the transmission of the control channel or of the data channel is not mapped to frequency resources used by the transmission of the MIB or of the first SIB, respectively.

12. The base station of claim 8, wherein the MIB transmission is repeated in more than one subframes per frame and in subframe symbols that exclude the first three subframe symbols in each of the more than one subframes.

13. The base station of claim 8, wherein the transmission of the first SIB is with repetitions and a number of repetitions is indicated by the MIB.

14. A User Equipment (UE) comprising:
a receiver configured to receive, in a cell having a bandwidth, a first system information block (SIB) within a frame that includes a predetermined number of subframes, and a control channel or a data channel, wherein the first SIB includes a bit-map of X bits having a one-to-one mapping with subframes from a set of X subframes;
a subframe from the set of X subframes that is mapped to a bitmap value of '0' belongs to a first subframe set and a subframe from the set of X subframes that is mapped to a bitmap value of '1' belongs to a second subframe set; and
the control channel or the data channel is received only in subframes of the first subframe set.

15. The UE of claim 14, further comprising:
a receiver configured to receive a master information block (MIB), wherein the MIB includes a field having a value mapping to a predetermined configuration of transmission parameters for the first SIB.

16. The UE of claim 15, wherein the reception parameters include a set of subframes within the frame.

17. The UE of claim 15, wherein the reception of the first SIB is in frequency resources that are determined as a function of a physical cell identity and the bandwidth and exclude frequency resources overlapping with seventy-two center sub-carriers of the bandwidth.

18. The UE of claim 17, wherein when the reception of the control channel or of the data channel is in a same subframe as the reception of the MIB or the first SIB, the control channel or the data channel is not received in frequency resources used for the reception of the MIB or of the first SIB, respectively.

19. The UE of claim 17, wherein the MIB is received more than one subframe per frame and in subframe symbols that exclude the first three subframe symbols in each of the more than one subframes.

20. The UE of claim 15, wherein the reception of the first SIB is with repetitions and a number of repetitions is indicated by the MIB.

* * * * *